(12) United States Patent
Abhinav et al.

(10) Patent No.: US 12,343,884 B2
(45) Date of Patent: Jul. 1, 2025

(54) ROBOTIC ASSEMBLY INSTRUCTION GENERATION FROM A VIDEO

(71) Applicant: Accenture Global Solutions Limited, Dublin (IE)

(72) Inventors: Kumar Abhinav, Hazaribag (IN); Alpana Dubey, Bangalore (IN); Shubhashis Sengupta, Bangalore (IN); Suma Mani Kuriakose, Mumbai (IN); Priyanshu Abhijit Barua, Pune (IN); Piyush Goenka, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 392 days.

(21) Appl. No.: 17/950,021

(22) Filed: Sep. 21, 2022

(65) Prior Publication Data

US 2024/0091948 A1 Mar. 21, 2024

(51) Int. Cl.
*B25J 9/16* (2006.01)
*G06T 7/10* (2017.01)

(52) U.S. Cl.
CPC ........... *B25J 9/1697* (2013.01); *B25J 9/1661* (2013.01); *G06T 7/10* (2017.01); *G06T 2207/10024* (2013.01); *G06T 2207/10028* (2013.01)

(58) Field of Classification Search
CPC .. G06T 2207/10028; G06T 2207/10024; B25J 9/1697; B25J 9/1661; G05B 2219/40111
See application file for complete search history.

(56) References Cited

U.S. PATENT DOCUMENTS 11,921,824 B1* 3/2024 Hester .................. G06N 3/045
2021/0086364 A1* 3/2021 Handa ..................... B25J 13/08
(Continued)

FOREIGN PATENT DOCUMENTS

CN 113591560 A * 11/2021 ............. G06N 3/045
WO WO-2023068929 A1 * 4/2023 ............. B25J 9/1612

OTHER PUBLICATIONS

Li, Shufei, et al. "Toward proactive human-robot collaborative assembly: A multimodal transfer-learning-enabled action prediction approach." IEEE Transactions on Industrial Electronics 69.8 (2021): 8579-8588 (Year: 2021).*
(Continued)

*Primary Examiner* — Michael Robert Cammarata
(74) *Attorney, Agent, or Firm* — POLSINELLI PC

(57) ABSTRACT

In some implementations, a robot host may receive a video associated with assembly using a plurality of sub-objects. The robot host may determine spatio-temporal features based on the video and may identify a plurality of actions represented in the video based on the spatio-temporal features. The robot host may map the plurality of actions to the plurality of sub-objects to generate an assembly plan and may combine output from a point cloud model and output from a color embedding model to generate a plurality of sets of coordinates corresponding to the plurality of sub-objects. The robot host may perform object segmentation to estimate a plurality of grip points and a plurality of widths corresponding to the plurality of sub-objects. Accordingly, the robot host may generate instructions, for robotic machines, based on the assembly plan, the plurality of sets of coordinates, the plurality of grip points, and the plurality of widths.

17 Claims, 19 Drawing Sheets

(56) References Cited

U.S. PATENT DOCUMENTS

| | | | |
|---|---|---|---|
| 2021/0101286 A1* | 4/2021 | Lee | B25J 9/163 |
| 2021/0166418 A1* | 6/2021 | Zhou | G06T 7/73 |
| 2021/0197389 A1* | 7/2021 | Hsieh | G06F 18/25 |
| 2022/0080581 A1* | 3/2022 | Wang | G06T 7/70 |
| 2022/0152818 A1* | 5/2022 | Kupcsik | G06T 7/13 |
| 2023/0339118 A1* | 10/2023 | Xu | G06T 7/10 |
| 2024/0017417 A1* | 1/2024 | Ye | B25J 9/1653 |
| 2024/0091950 A1* | 3/2024 | Hong | G06T 7/50 |
| 2024/0131704 A1* | 4/2024 | Gonzalez Aguirre | B25J 9/1661 |

OTHER PUBLICATIONS

Wan, Weiwei, et al. "Teaching robots to do object assembly using multi-modal 3d vision." Neurocomputing 259 (2017): 85-93. (Year: 2017).*

A. Doumanoglou, R. Kouskouridas, S. Malassiotis, T. K. Kim, Recovering 6D Object Pose and Predicting Next-Best-View in the Crowd. In Proceedings of the IEEE Conference on Computer Vision and Pattern Recognition, CVPR 2016. (Year: 2016).*

Sener, Fadime, and Angela Yao. "Unsupervised learning and segmentation of complex activities from video." Proceedings of the IEEE Conference on Computer Vision and Pattern Recognition. 2018. (Year: 2018).*

Wang, Yue, et al. "MASD: A multimodal assembly skill decoding system for robot programming by demonstration." IEEE Transactions on Automation Science and Engineering 15.4 (2018): 1722-1734. (Year: 2018).*

Liang, Ci-Jyun, Vineet R. Kamat, and Carol C. Menassa. "Teaching robots to perform quasi-repetitive construction tasks through human demonstration." Automation in Construction 120 (2020): 103370. (Year: 2020).*

Sera, et al., "Assembly Planning by Recognizing a Graphical Instruction Manual," Automation Research Team, Industrial CPS Research Center (2021), National Institute of Advanced Industrial Science and Technology (Tokyo, Japan), 8 pages.

Thomas, et al., "Learning Robotic Assembly from CAD," arXiv (Jul. 24, 2018), 8 pages.

Gu, et al., "Automated Assembly Skill Acquisition and Implementation through Human Demonstration" (2017), 14 pages.

Haage, et al., "Teaching Assembly by Demonstration using Advanced Human Robot Interaction and a Knowledge Integration Framework," 27th International Conference on Flexible Automation and Intelligent Manufacturing, Procedia Manufacturing 11 (Jun. 27-30, 2017), pp. 164-173.

Wan, et al., "Teaching robots to do object assembly using multi-modal 3D vision," Neurocomputing 259 (2017), pp. 85-93.

* cited by examiner

ROBOTIC ASSEMBLY INSTRUCTION GENERATION FROM A VIDEO

BACKGROUND

Automating tasks using robotic machines depends on programming the robotic machines correctly. For example, during an assembly process, a robotic arm should be programmed to move into position to grasp an item correctly and then move the item into a correct position. In another example, during an assembly process, a robotic drill should be programmed to move into position to tighten a fastener, such as a screw or bolt.

SUMMARY

Some implementations described herein relate to a method. The method may include receiving a video that encodes a plurality of frames associated with assembly of an object from a plurality of sub-objects. The method may include determining spatio-temporal features based on the plurality of frames. The method may include identifying a plurality of actions represented in the video based on the spatio-temporal features. The method may include mapping the plurality of actions to the plurality of sub-objects to generate an assembly plan based on the video. The method may include combining output from a point cloud model and output from a color embedding model to generate a plurality of sets of coordinates corresponding to the plurality of sub-objects, wherein each set of coordinates corresponds to a respective action of the plurality of actions. The method may include performing object segmentation to estimate a plurality of grip points and a plurality of widths corresponding to the plurality of sub-objects. The method may include generating instructions, for one or more robotic machines for each action of the plurality of actions, based on the assembly plan, the plurality of sets of coordinates, the plurality of grip points, and the plurality of widths.

Some implementations described herein relate to a device. The device may include one or more memories and one or more processors communicatively coupled to the one or more memories. The one or more processors may be configured to receive a video that encodes a plurality of frames associated with assembly of an object from a plurality of sub-objects. The one or more processors may be configured to determine spatio-temporal features based on the plurality of frames. The one or more processors may be configured to identify a plurality of actions represented in the video based on the spatio-temporal features. The one or more processors may be configured to map the plurality of actions to the plurality of sub-objects to generate an assembly plan based on the video. The one or more processors may be configured to combine output from a point cloud model and output from a color embedding model to generate a plurality of sets of coordinates corresponding to the plurality of sub-objects, wherein each set of coordinates corresponds to a respective action of the plurality of actions. The one or more processors may be configured to perform object segmentation to estimate a plurality of grip points and a plurality of widths corresponding to the plurality of sub-objects. The one or more processors may be configured to generate instructions, for one or more robotic machines for each action of the plurality of actions, based on the assembly plan, the plurality of sets of coordinates, the plurality of grip points, and the plurality of widths.

Some implementations described herein relate to a non-transitory computer-readable medium that stores a set of instructions for a device. The set of instructions, when executed by one or more processors of the device, may cause the device to receive a video that encodes a plurality of frames associated with assembly of an object from a plurality of sub-objects. The set of instructions, when executed by one or more processors of the device, may cause the device to determine spatio-temporal features based on the plurality of frames. The set of instructions, when executed by one or more processors of the device, may cause the device to identify a plurality of actions represented in the video based on the spatio-temporal features. The set of instructions, when executed by one or more processors of the device, may cause the device to map the plurality of actions to the plurality of sub-objects to generate an assembly plan based on the video. The set of instructions, when executed by one or more processors of the device, may cause the device to combine output from a point cloud model and output from a color embedding model to calculate a plurality of sets of coordinates corresponding to the plurality of sub-objects, wherein each set of coordinates corresponds to a respective action of the plurality of actions. The set of instructions, when executed by one or more processors of the device, may cause the device to perform object segmentation to estimate a plurality of grip points and a plurality of widths corresponding to the plurality of sub-objects. The set of instructions, when executed by one or more processors of the device, may cause the device to generate instructions, for one or more robotic machines for each action of the plurality of actions, based on the assembly plan, the plurality of sets of coordinates, the plurality of grip points, and the plurality of widths.

DETAILED DESCRIPTION

Figure 1A:
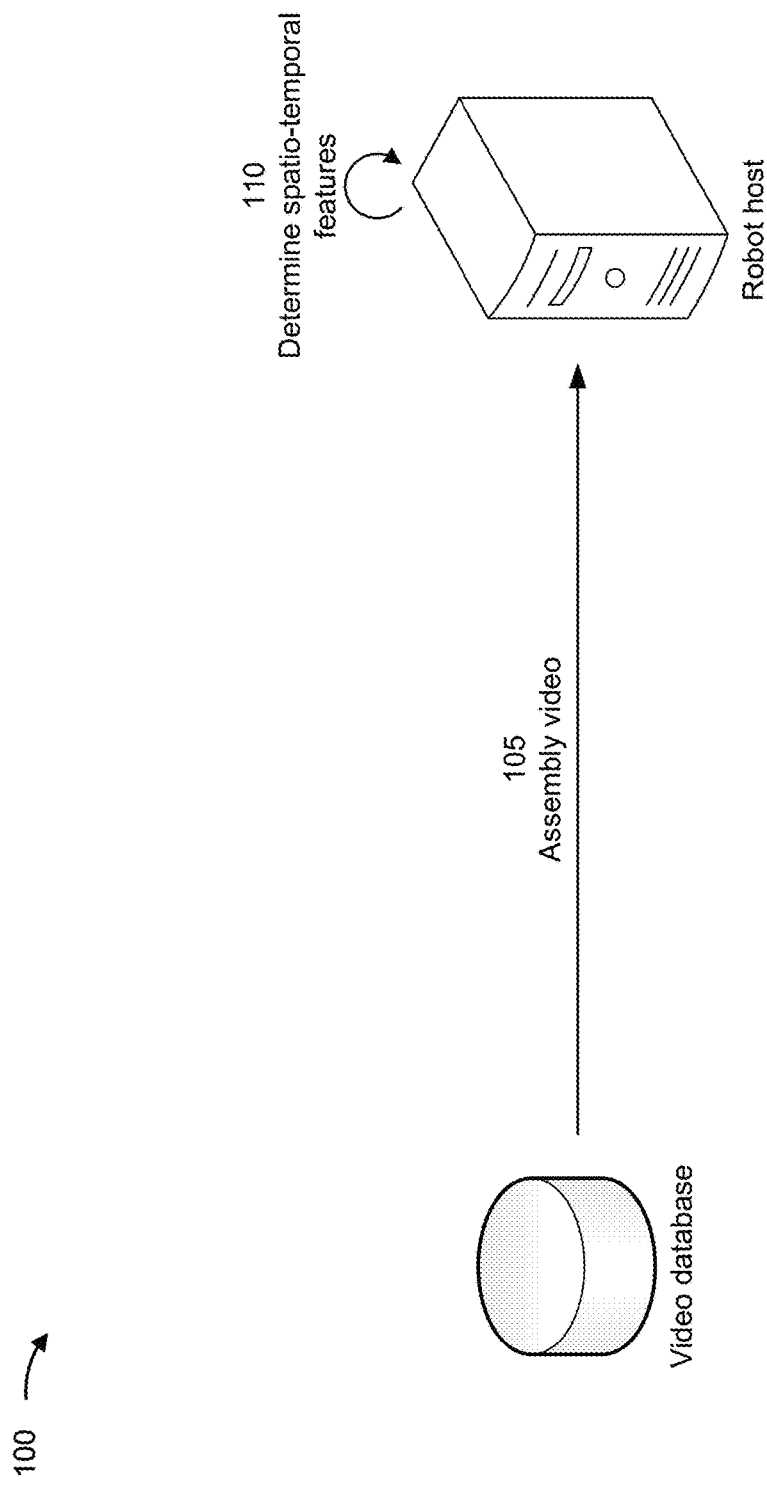
FIGS. 1A-1F are diagrams of an example implementation described herein.

The following detailed description of example implementations refers to the accompanying drawings. The same reference numbers in different drawings may identify the same or similar elements.

Programming a robotic machine to assemble an object is a time-consuming process. For example, a computer may refine programming code, for the robotic machine, across multiple iterations based on user input, which consumes power and processing resources each time the programming code is adjusted. Furthermore, the programming code may be debugged over multiple test iterations, and the computer consumes power and processing resources each time the programming code is re-compiled and re-tested.

Additionally, automated techniques for generating robotic instructions often consume significant amounts of power and processing resources. For example, using augmented reality (AR) markers when recording a video of an assembly process provides significant amounts of data from which programming code, for the robotic machine, may be generated. However, determining significant amounts of data using the AR markers consumes significant amounts of power, processing resources, and memory space. In another example, using motion sensors, such as Microsoft®'s Kinect®, along with particular coordinate markers, similarly provides data from which programming code, for the robotic machine, may be generated. However, determining significant amounts of data using the motion sensors also consumes significant amounts of power, processing resources, and memory space.

Furthermore, generating robotic instructions typically relies on profiles of items used during an assembly process. For example, existing data structures regarding screws, bolts, and other items used during the assembly process allow the robotic machine to properly grasp and manipulate the items used during the assembly process. However, generating profiles of the items in advance is a time-consuming process. Additionally, because generating the profiles may depend on capturing and processing scans of the items, power and processing resources are also consumed in generating the profiles.

By applying a combination of machine learning techniques to a video of an assembly process, instructions for a robotic machine may be generated. Some implementations described herein enable generation of an assembly plan from spatio-temporal features of the video of the assembly process. As used herein, "assembly plan" refers to a data structure that indicates a plurality of actions, linked in a process, that are associated with indicated sub-objects. As a result, using the assembly plan conserves power and processing resources because the video is analyzed without AR markers, motion sensors, or other complex hardware. Additionally, some implementations described herein enable calculation of grip points and widths for the sub-objects in the video. As a result, the instructions for the robotic machine may be generated for new sub-objects without consuming additional memory space, power, and processing resources to generate profiles for the new sub-objects in advance.

FIGS. 1A-1F are diagrams of an example implementation 100 associated with generating robotic assembly instructions from a video. As shown in FIGS. 1A-1F, example implementation 100 includes a robot host, a robot device, a video database, and an assembly plan storage. These devices are described in more detail below in connection with FIG. 10 and FIG. 11.

As shown in FIG. 1A and by reference number 105, the video database may transmit, and the robot host may receive, a video (e.g., as a video file or as streamed video information) that encodes frames (e.g., a plurality of frames) associated with assembly of an object from sub-objects (e.g., a plurality of sub-objects). The video may represent a person (or another animate entity) assembling the object. In some implementations, an operator of the robot host may trigger (e.g., with input) the video database to transmit the video to the robot host. For example, the operator may instruct the robot host to generate instructions for the robot device based on the video (e.g., indicated by the input). In some implementations, the robot host may request the video from the video database such that the video database transmits the video in response to the request. For example, an operator of the robot host may configure a batch job such that the robot host sequentially requests videos from the video database and generates instructions for the robot device based on the videos (e.g., indicated by the batch job configuration).

As shown by reference number 110, the robot host may determine spatio-temporal features based on the frames. For example, as described in connection with FIGS. 2 and 3, the robot host may apply a combination of convolutional filters (e.g., convolutional neural networks (CNNs)) to the frames to generate feature values. Furthermore, as described in connection with FIGS. 3 and 4, the robot host may combine the feature values to generate feature maps and may generate attention maps based on the feature maps. As described in connection with FIGS. 2 and 4, the robot host may normalize the attention maps (e.g., across a spatial dimension and/or a time dimension) to generate the spatio-temporal features. The spatio-temporal features may represent, numerically, portions of the frames, in space and time, that are most important. For example, the spatio-temporal features may represent, numerically, portions of the frames, in space and time, that are associated with motion (and therefore with an action being performed by the person in the video).

Figure 1B:
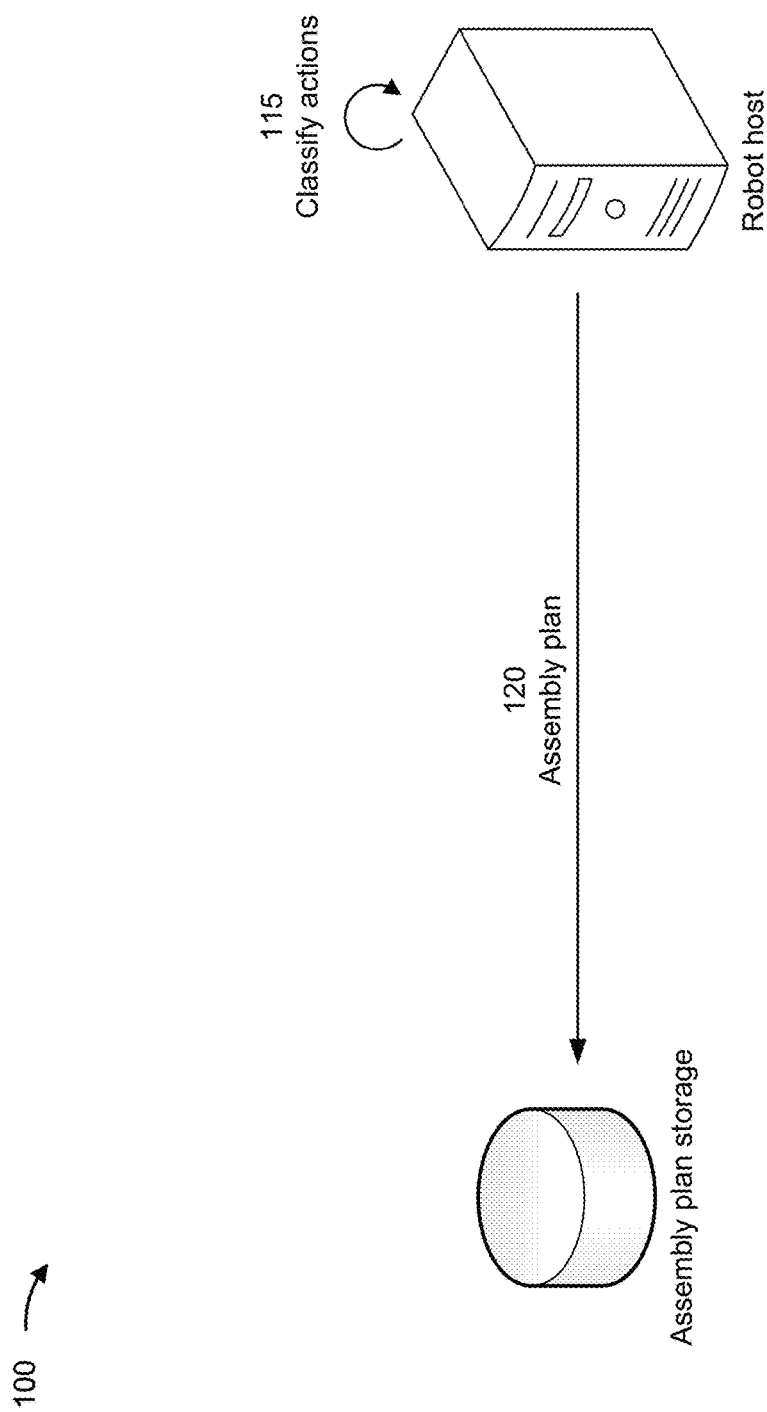

As shown in FIG. 1B and by reference number 115, the robot host may identify actions (e.g., a plurality of actions) represented in the video based on the spatio-temporal features. For example, the robot host may feed the spatio-temporal features to a fully connected (FC) layer (e.g., one or more FC layers) in an artificial neural network (ANN), as described in connection with FIG. 2. "Fully connected layer" refers to a layer of artificial neurons in which each output neuron is connected to all input neurons. Accordingly, the robot host may feed output from the FC layer to a softmax layer to generate action labels for the frames (e.g., for each frame or at least for each group of frames), as described in connection with FIG. 2. "Softmax layer" refers to a function that converts real numbers (e.g., one or more real numbers in a vector) to a probability distribution (e.g., over two or more possible outcomes). Accordingly, the robot host may select the action label for each frame (or each group of frames) as the action label with a largest probability in the probability distribution associated with the frame (or the group of frames). Additionally, or alternatively, the robot host may select the action label for each frame (or each group of frames) as the action label with a probability, in the probability distribution, that satisfies a classification threshold.

In some implementations, the frames may be associated with duplicate labels. For example, the person in the video may move a sub-object such that the movement is represented across two, three, or more frames. Accordingly, the robot host may label each frame representing the movement as a "move" action. Therefore, the robot host may group consecutive frames associated with the "move" action label together as a group so that the group of frames results in a single "move" action within an assembly plan (e.g., as described below in connection with reference number 120).

In some implementations, a stray frame within a group of frames may have a different label. For example, a sequence of twelve frames in which the person in the video moves a sub-object may include a middle frame (e.g., a fourth or fifth frame) that is associated with a label other than the "move" action label. Accordingly, the robot host may disregard the label for the middle frame. For example, the robot host may determine that an action label, associated with a frame that is surrounded both earlier in time and later in time by a group of frames associated with a different label, is an erroneous action label. The group of frames may have a quantity of frames that satisfy an error threshold. For example, the action label may be determined to be erroneous only when an error threshold of three frames earlier in time and three frames later in time (among other threshold example values) is satisfied. Although described using a same error threshold both forward and backward in time, the robot host may alternatively apply different error thresholds. For example, the action label may be determined to be erroneous only when a first threshold of four frames earlier in time and a second error threshold of five frames later in time are satisfied. Additionally, or alternatively, a stray frame may be associated with a probability distribution such that no probability in the distribution satisfies the classification threshold. Accordingly, the robot host may apply no label to the stray frame.

By using spatio-temporal features to determine action labels, the robot host may process videos without AR markers, motion sensors, or other complex hardware. As a result, the robot host may process more types of videos while also conserving processing resources, power, and storage space (e.g., both in the video database and in a cache and/or memory of the robot host).

Figure 5:
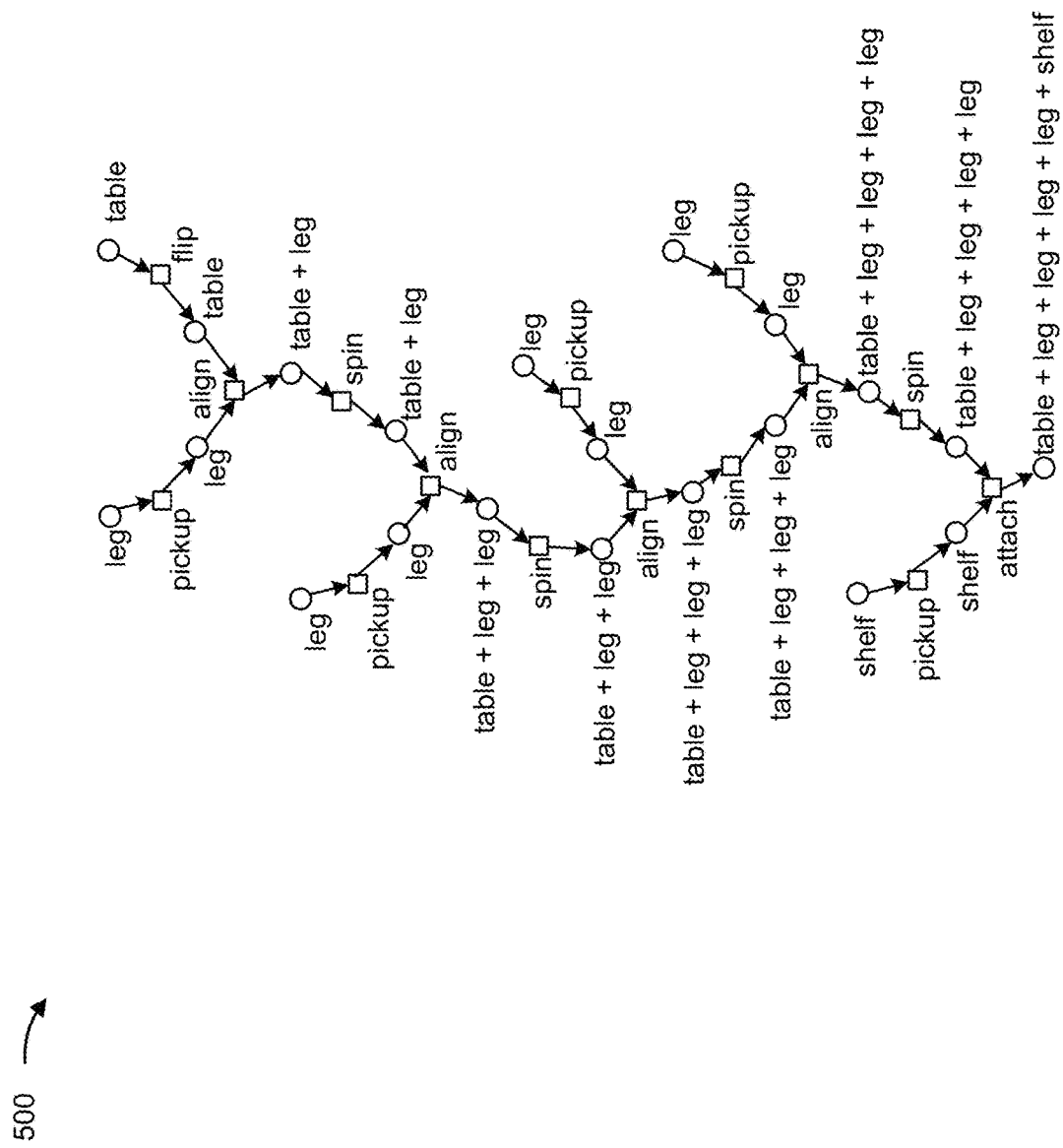
FIG. 5 is a diagram of an example assembly plan.

As shown by reference number 120, the robot host may generate an assembly plan based on the video and transmit the assembly plan to the assembly plan storage. "Assembly plan" refers to a data structure that indicates actions (e.g., at least one action) in association with sub-objects (e.g., at least one sub-object). For example, as shown in FIG. 5, the assembly plan may be a graphical data structure that links sub-objects indicated in the assembly plan to actions indicated in the assembly plan. Other types of data structures, such as a tabular data structure, may be used. In some implementations, the assembly plan storage may be local to the robot host. For example, the assembly plan storage may comprise a cache, a memory, or a drive, among other examples, integrated into, and used by, the robot host. Alternatively, the assembly plan storage may be at least partially separate (e.g., physically, logically, and/or virtually) from the robot host. Accordingly, the robot host may transmit the assembly plan over a bus and/or a network to store the assembly plan in the assembly plan storage. The robot host may store the assembly plan for later use (e.g., as described in connection with reference numbers 130 and 150).

To generate the assembly plan, the robot host may iterate through the frames and generate a new node representing an action when a frame having an action label that is different than a previous action label is detected. For each action node, the robot host may determine a sub-object (e.g., at least one sub-object) that is an input to the node and a sub-object (e.g., at least one sub-object) that is an output from the node. Therefore, the nodes representing the actions are connected by the sub-objects input thereto and output therefrom, as shown in FIG. 5. For a "flip," "pickup," or "move" action, among other examples, the input and output sub-object may be the same sub-object. For a combinatory action, such as "align" or "attach," the input sub-objects may become a single output sub-object. On the other hand, for a decombinatory action, such as "detach" or "break," the input sub-object may become multiple output sub-objects. Accordingly, the robot host may generate an assembly plan that includes, as initial input sub-objects, all original sub-objects in the video and includes, as output, a final assembled object in the video (along with any sub-objects to be disposed of).

By generating an assembly plan, the robot host may generate an overall instruction flow, from the video, without AR markers, motion sensors, or other complex hardware. As a result, the robot host may process more types of videos while also conserving processing resources, power, and storage space (e.g., both in the video database and in a cache and/or memory of the robot host).

Figure 1C:
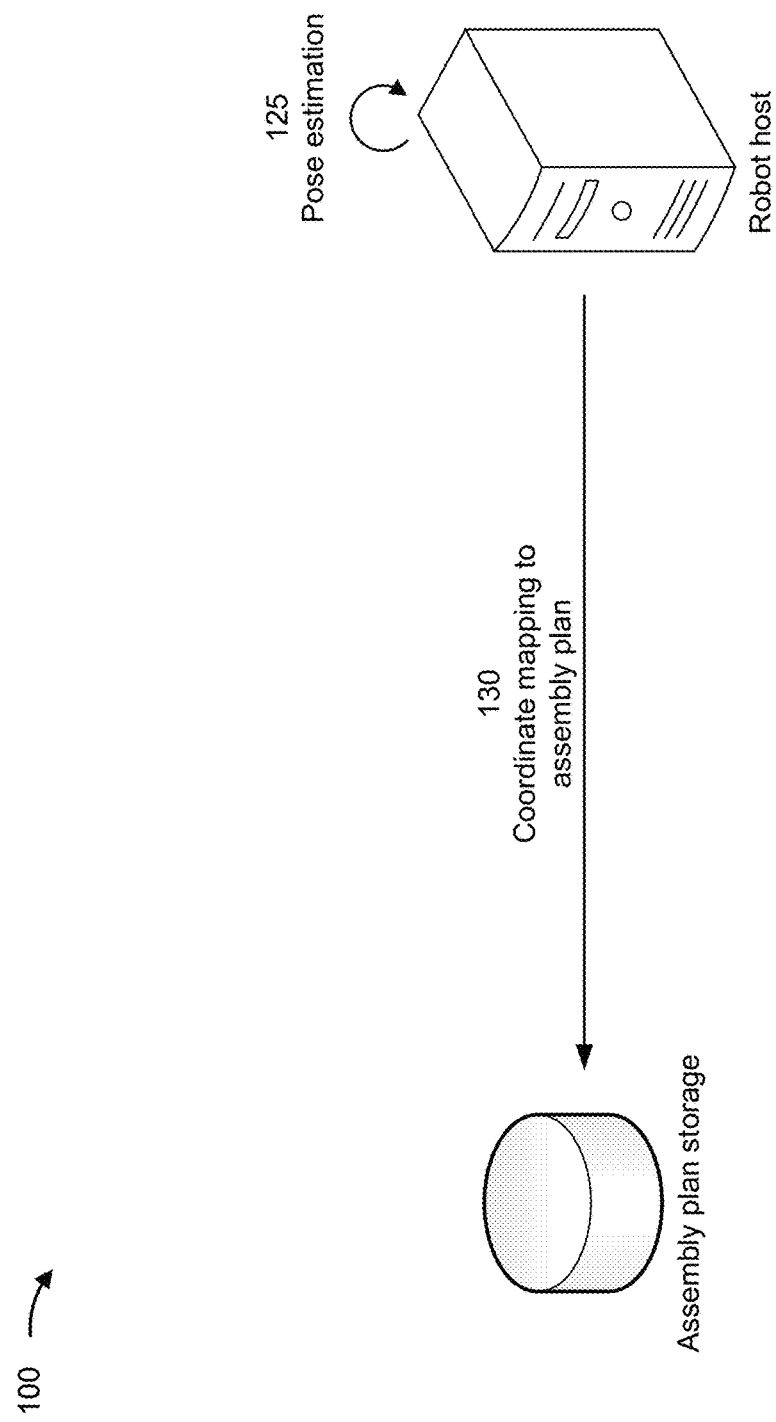

As shown in FIG. 1C and by reference number 125, the robot host may perform pose estimation for the sub-objects represented in the video. For example, the robot host may identify sub-objects across frames of the video. The robot host may use an object segmentation model, such as a fully convolutional network (FCN) for object segmentation or a region CNN (R-CNN), among other examples. Accordingly, the robot host may determine a sub-object label and an object mask for each sub-object within each frame. Generally, the label for a sub-object will persist across frames, while the object mask may move when the sub-object is translated and/or rotated (e.g., by the person represented in the video). The robot host may discard and/or re-label identified sub-objects based on an erroneous sub-object label in a stray frame, similarly as described above in connection with action labels.

Furthermore, the robot host may apply a color embedding model (e.g., as described in connection with FIG. 8A) and apply a point cloud model (e.g., as described in connection with FIG. 8B) to frames in the video (e.g., cropped according to identified sub-objects, as described above). Accordingly, the robot host may combine output from the point cloud model and output from the color embedding model (e.g., as described in connection with FIGS. 6 and 7). The robot host may thus generate sets of coordinates (e.g., a plurality of sets of coordinates) corresponding to the sub-objects. For example, each sub-object identified in the video may have a set of coordinates (e.g., six-dimensional coordinates, such as three-dimensional position (x, y, and z) with three-dimensional rotation (yaw a, pitch (3, and roll y)).

In some implementations, the robot host may generate a pixel-wise dense fusion matrix (e.g., as described in connection with FIG. 7) using the output from the point cloud model and the output from the color embedding model. Furthermore, the robot host may generate global features (e.g., as described in connection with FIG. 7) based on pooling the output from the point cloud model and the output from the color embedding model. As used herein, "pooling" refers to a downsampling function that reduces dimensionality of a set of numbers (e.g., one or more numbers of a vector). Therefore, the robot host may calculate the sets of coordinates based on the pixel-wise dense fusion matrix and the global features. For example, the robot host may apply a softmax layer or another type of predictor or estimator to convert the pixel-wise dense fusion matrix and the global features into sets of coordinates.

Each set of coordinates may correspond to a respective action of the plurality of actions. For example, the robot host may, for each sub-object and each frame, generate a set of coordinates such that the set of coordinates for that frame and that sub-object corresponds to an action label for that frame involving that sub-object. Therefore, the sets of coordinates for a sub-object, corresponding to a group of frames that are associated with a same action label, represent movement of the sub-object through the group of frames during the action represented by the action label.

As shown by reference number 130, the robot host may map the sets of coordinates, for each sub-object, to actions represented in the assembly plan. For example, as described above, each action represented in the assembly plan may correspond to a group of frames in the video and may be associated with input sub-objects and output sub-objects. Accordingly, the sets of coordinates, for the input and output sub-objects, that correspond to the group of frames are mapped to the action in the assembly plan based on the group frames. The robot host may perform this mapping iteratively (e.g., through the frames and/or through the actions represented in the assembly plan). In some implementations, the robot host may update the stored assembly plan in the assembly plan storage with the sets of coordinates. Accordingly, the robot host may store the sets of coordinates for later use (e.g., as described in connection with reference number 150).

By calculating the sets of coordinates directly from the video, the robot host may process the video without AR markers, motion sensors, or other complex hardware. As a result, the robot host may process more types of videos while also conserving processing resources, power, and storage space (e.g., both in the video database and in a cache and/or memory of the robot host).

Figure 1D:
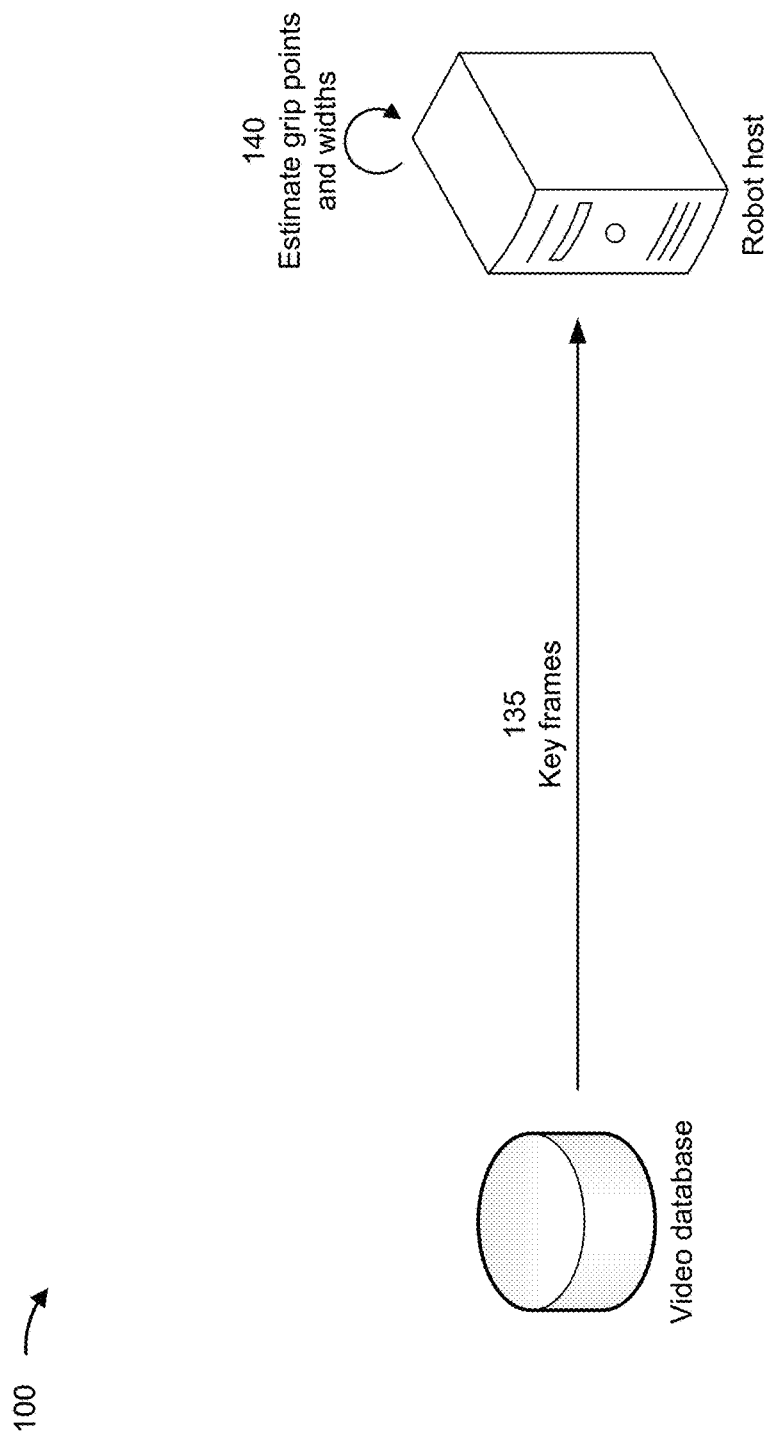

As shown in FIG. 1D and by reference number 135, the video database may transmit, and the robot host may receive, key frames from the video associated with the actions represented in the assembly plan. In some implementations, the robot host may request the key frames from the video database (e.g., by indicating frame numbers associated with the key frames in the request) such that the video database transmits the key frames in response to the request. The video database may extract the key frames from the video as image files or as partially decoded video information (e.g., by converting any key frames that are P frames or B frames to I frames), among other examples. In some implementations, the robot host may determine, for each action represented in the assembly plan, a corresponding key frame as a beginning frame, an ending frame, a middle frame, or a randomly selected frame, from a group of frames that correspond to the action. As described above, the group of frames that correspond to the action may be a sequential set of frames in the video, all associated with a same action label, such that the robot host generates a single node representing the action in the assembly plan based on the group of frames.

As shown by reference number 140, the robot host may perform segmentation to estimate grip points (e.g., a plurality of grip points) and widths (e.g., a plurality of widths), corresponding to the sub-objects. For a sub-object, the grip points may be represented by three-dimensional coordinates of contact points (e.g., one or more contact points) where the robot device may grab (or otherwise grip) the sub-object. In some implementations, different grip points may be associated with different surfaces of the sub-object, and each width for the sub-object may represent a distance between corresponding grip points (e.g., on opposite surfaces of the sub-object), as shown in FIG. 9B. Thus, when the robot host is generating instructions to move a sub-object (e.g., as described in connection with reference number 150), the robot host may further generate instructions to move the robot device to align with the grip points of the sub-object and to use the width associated with the sub-object (e.g., when closing a robotic arm or hand or otherwise gripping the sub-object) to secure the sub-object before the robot device moves the sub-object.

In some implementations, as described in connection with FIG. 9A, the robot host may generate dense feature maps based on the key frames and may cluster pixels of the key frames based on the dense feature maps in order to form clustered pixels. For example, the robot host may apply a CNN to generate the dense feature map and cluster the pixels based on metric learning loss. Accordingly, the grip points and the widths are estimated based on the clustered pixels. For example, as described in connection with FIG. 9A, the robot host may determine edge pixels in each cluster as the grip points for the sub-object corresponding to the cluster. Further, the robot host may calculate the widths as distances between corresponding grip points (e.g., on opposite sides of the cluster corresponding to the sub-object).

By calculating grip points and widths from the video, the robot host may refrain from using scans and/or other stored profiles associated with the sub-objects. As a result, the robot host may conserve memory space (e.g., by refraining from using a profile database as well as a cache and/or memory of the robot host) and may conserve power and processing resources that would otherwise have been used to generate the stored profiles for the sub-objects in advance.

Figure 1E:
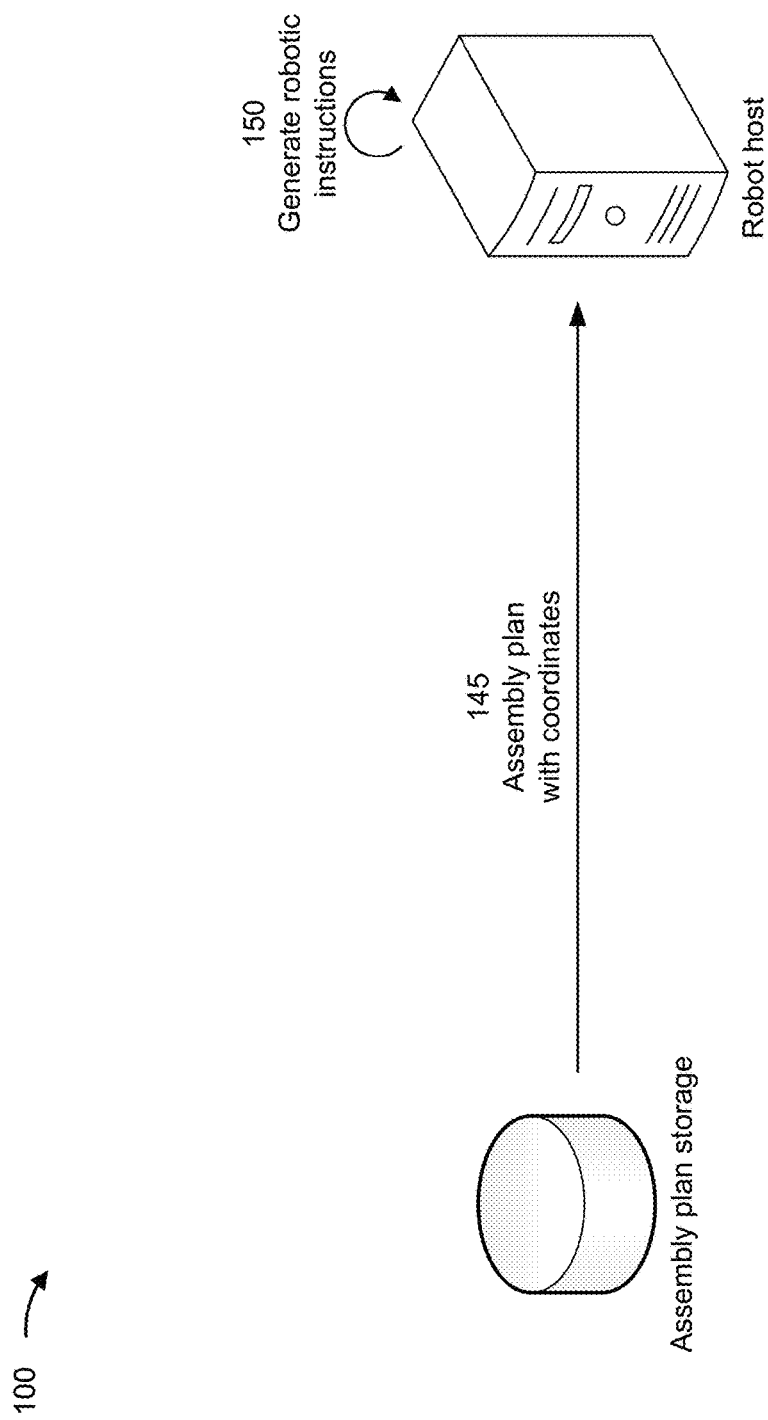

As shown in FIG. 1E and by reference number 145, the assembly plan storage may transmit, and the robot host may receive, the stored assembly plan (e.g., as described in connection with reference number 120). As further shown by reference number 145, the assembly plan storage may additionally transmit, and the robot host may additionally receive, the sets of coordinates that were mapped to actions represented in the assembly plan (e.g., as described above in connection with reference number 130). In some implementations, the robot host may request the assembly plan (and the sets of coordinates) from the assembly plan storage such that the assembly plan storage transmits the assembly plan (and the sets of coordinates) in response to the request.

As shown by reference number 150, the robot host may generate instructions, for the robot device (e.g., including one or more robotic machines) for each action of the plurality of actions, based on the assembly plan, the sets of coordinates, the grip points, and the widths. For example, the robot host may generate instructions for the robot device to grip each sub-object (e.g., according to the grip points and the width(s) for the sub-object), associated with an action represented in the assembly plan, and manipulate the sub-object according to the sets of coordinates associated with the sub-object and the action. By iteratively generating instructions, according to the sequence of actions and sub-objects represented in the assembly plan, the robot host generates instructions for the robot device to assemble the object from the sub-objects according to the video.

In some implementations, the robot host may apply rapidly exploring random trees to the assembly plan, where the actions represented in the assembly plan are associated with state transitions (e.g., a plurality of state transitions). For example, the action may represent a state transition for sub-objects associated with the action from an initial state before the action) to a final state (after action). Accordingly, the sequence of actions represented in the assembly plan correspond to a sequence of state transitions. The robot host may begin at an initial state associated with a first action represented in the assembly plan and iteratively attempt to reduce distance from the initial state to a final state associated with an ultimate action represented in the assembly plan. The robot host thus applies rapidly exploring random trees to iteratively find a shortest (at least locally) path of robotic instructions through the sequence of actions represented in the assembly plan. The robot host may therefore generate machine-level instructions, corresponding to the state transitions, based on the sets of coordinates, the grip points, and the widths.

Figure 1F:
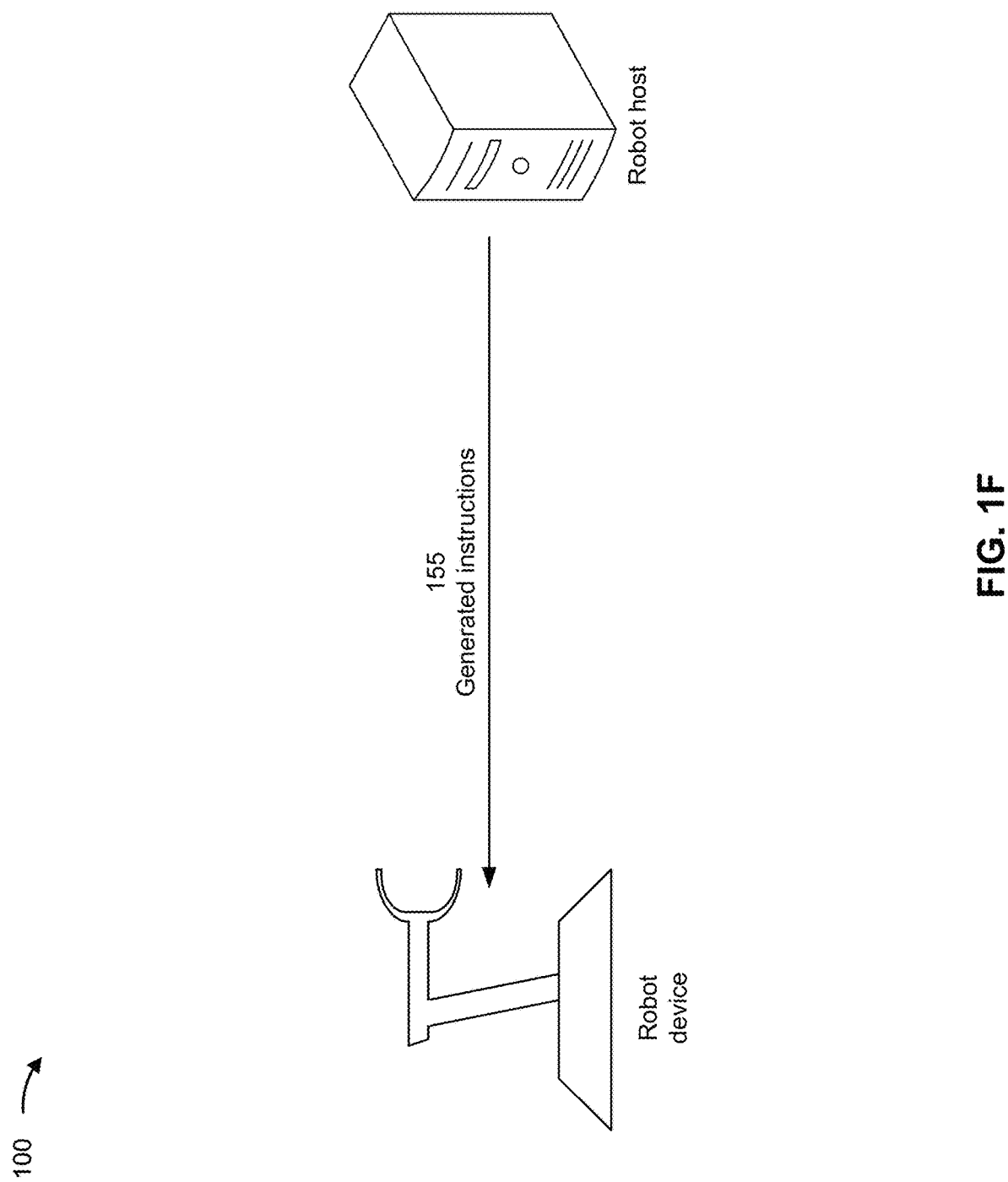

As shown in FIG. 1F and by reference number 155, the robot host may transmit, and the robot device may receive, the generated instructions. For example, the robot host may transmit the instructions as commands to the robot device. Accordingly, the robot device may perform an assembly process corresponding to the video. In some implementations, the robot host may transmit the instructions to program the robot device. Accordingly, the robot device may perform the assembly process over and over (e.g., in a factory setting or another assembly-line-like setting) according to the instructions. For example, an operator of the robot device may trigger the robot device to repeatedly perform the assembly process corresponding to the video. In some implementations, the robot device may perform the assembly process each time the robot device receives a trigger (e.g., from the operator) or may repeat the assembly process according to a schedule. The schedule may be preconfigured (e.g., with a timed interval between each performance of the assembly process) or may be sensor-based (e.g., with each performance of the assembly process being triggered by movement of an assembly line or another type of environmental trigger).

By using techniques as described in connection with FIGS. 1A-1F, the robot host generates the assembly plan from the spatio-temporal features based on the video. As a result, the robot host conserves power and processing resources because the video is analyzed without AR markers, motion sensors, or other complex hardware. Additionally, the robot host calculates grip points and widths for the sub-objects based on the video. As a result, the robot host refrains from using stored profiles for the sub-objects, which conserves memory space as well as power and processing resources that would otherwise have been consumed in generating profiles for the sub-objects in advance.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
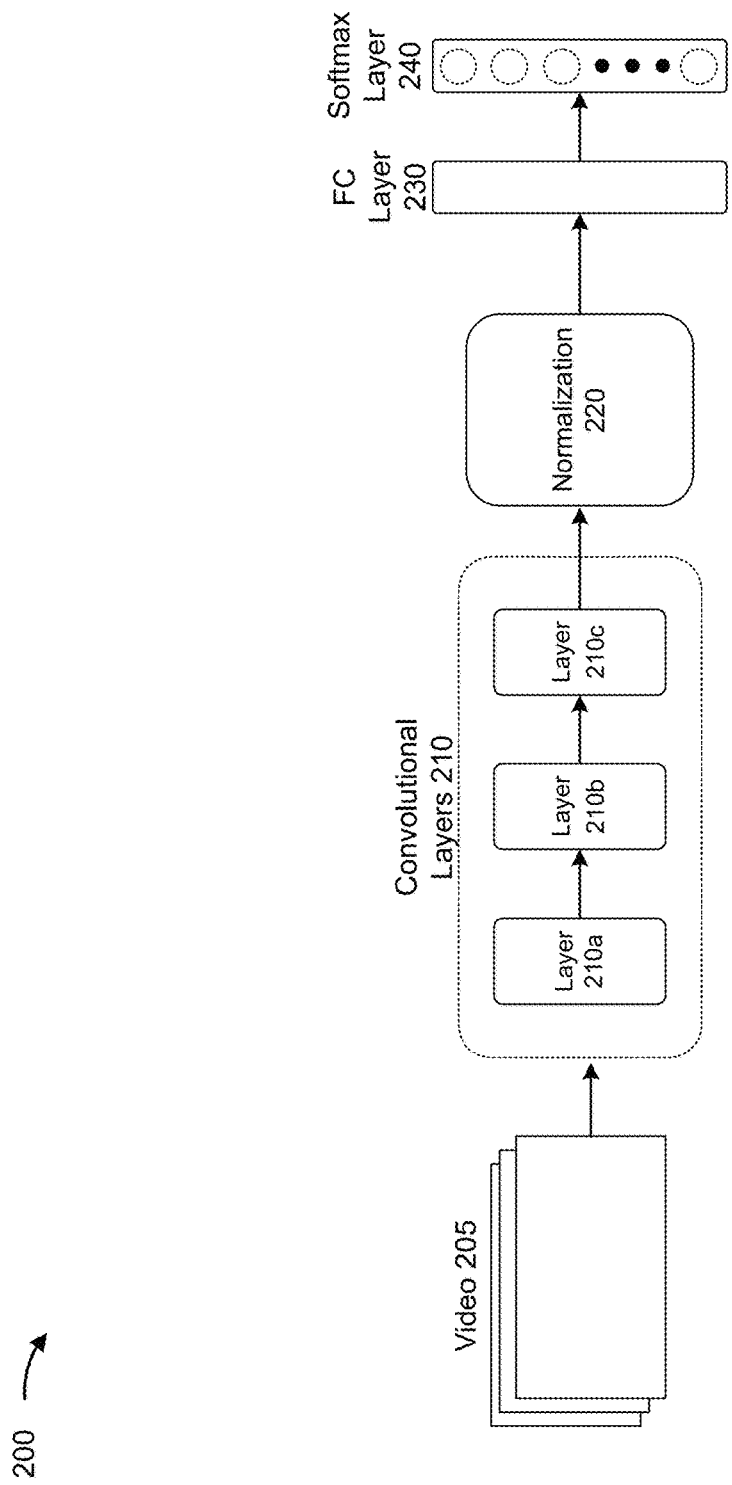
FIG. 2 is a diagram of an example implementation associated with generating an assembly plan from a video.

FIG. 2 is a diagram of an example implementation 200 associated with generating an assembly plan from a video. Example implementation 200 may be performed by a robot host, as described in more detail below in connection with FIG. 10 and FIG. 11.

As shown in FIG. 2, a video 205 (e.g., encoded as a video file or streamed video information, among other examples) is fed to a set of convolutional layers 210. For example, the convolutional layers 210 may form a CNN configured to generate feature values based on frames of the video 205. Each convolutional layer 210a, 210b, and 210c may extract spatial feature values (e.g., based on a single frame), temporal feature values (e.g., based on a frame in combination with at least one previous frame and/or at least one subsequent frame), or a combination thereof. In one example, the set of convolutional layers 210 may comprise a Pseudo-3D (P3D) network. For example, the convolutional layer 210a may be a P3D-A block, the convolutional layer 210b may be a P3D-B block, and the convolutional layer 210c may be a P3D-C block. Although described with respect to three convolutional layers, example implementation 200 may use fewer convolutional layers (e.g., two layers or one layer) or additional convolutional layers (e.g., four layers, five layers, and so on) to generate the feature values.

As further shown in FIG. 2, the feature values generated by the set of convolutional layers 210 may undergo normalization 220. For example, the normalization 220 may include operations as described in connection with FIG. 4, such as spatial normalization in combination with temporal normalization, to generate spatio-temporal features.

As further shown in FIG. 2, the spatio-temporal features may be fed to an FC layer 230 that is connected to a softmax layer 240. The softmax layer 240 may generate, for each frame in the video 205, a corresponding set of probabilities (e.g., a probability distribution). For example, the softmax layer 240 may include a neuron (e.g., at least one neuron) associated with each action label in a set of possible action labels. According, each neuron outputs a probability that the input (e.g., based on a frame) corresponds to the action label associated with the neuron. Therefore, the set of probabilities output by the neurons in the softmax layer 240 may be used to select an action label for each frame, as described in connection with FIG. 1.

As indicated above, FIG. 2 is provided as an example. Other examples may differ from what is described with regard to FIG. 2.

Figure 3:
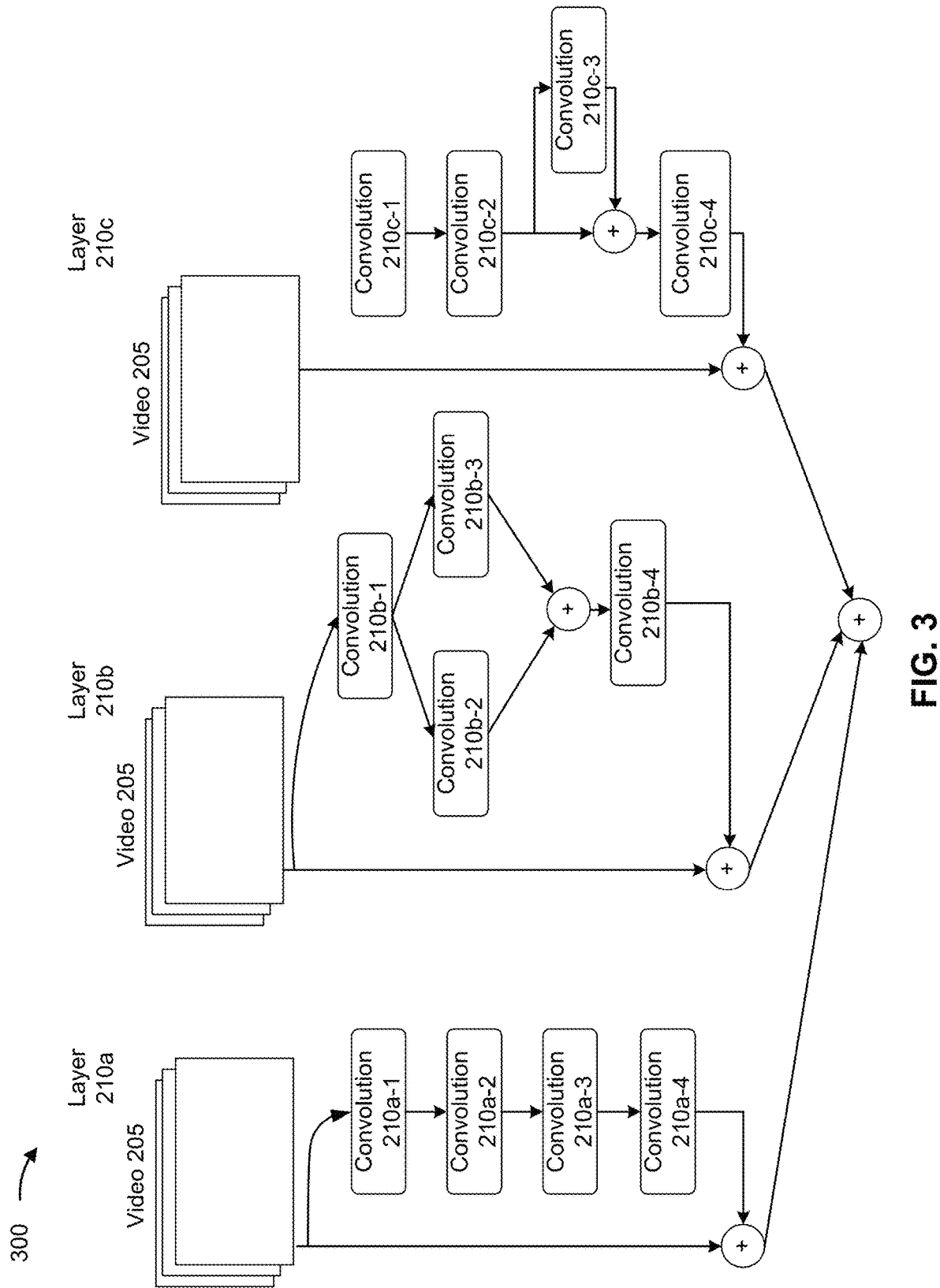
FIG. 3 is a diagram of an example implementation associated with determining feature maps from a video.

FIG. 3 is a diagram of an example implementation 300 associated with determining feature maps from a video. Example implementation 300 may be performed by a robot host, as described in more detail below in connection with FIG. 10 and FIG. 11.

As shown in FIG. 3, a video 205 (e.g., encoded as a video file or streamed video information, among other examples) is fed to a first convolutional layer 210a, a second convolutional layer 210b, and a third convolutional layer 210c. In one example, the convolutional layers 210a, 210b, and 210b may comprise a P3D network. For example, the convolutional layer 210a may be a P3D-A block, the convolutional layer 210b may be a P3D-B block, and the convolutional layer 210c may be a P3D-C block. Although described with respect to three convolutional layers, example implementation 300 may use fewer convolutional layers (e.g., two layers or one layer) or additional convolutional layers (e.g., four layers, five layers, and so on) to generate the feature values.

As further shown in FIG. 3, the convolutional layer 210a may initialize the feature values for each frame according to activation functions in a convolutional filter 210a-1. The initialized feature values may be adjusted according to spatial features of the frame by a convolutional filter 210a-2, which are further adjusted according to temporal features of the frame (and neighboring frames) by a convolutional filter 210a-3. Accordingly, a convolutional filter 210a-4 may normalize and output feature values for the first convolutional layer 210a.

As further shown in FIG. 3, the convolutional layer 210b may initialize the feature values for each frame according to activation functions in a convolutional filter 210b-1. The initialized feature values may be adjusted according to spatial features of the frame by a convolutional filter 210b-2 and may be separately adjusted according to temporal features of the frame (and neighboring frames) by a convolutional filter 210b-3. Accordingly, a convolutional filter 210b-4 may combine, normalize, and output feature values for the second convolutional layer 210b.

As further shown in FIG. 3, the convolutional layer 210c may initialize the feature values for each frame according to activation functions in a convolutional filter 210c-1. The initialized feature values may be adjusted according to spatial features of the frame by a convolutional filter 210c-2, which are further adjusted according to temporal features of the frame (and neighboring frames) by a convolutional filter 210c-3. The outputs from the convolutional filter 210c-2 and the convolutional filter 210c-3 may be combined, and a convolutional filter 210c-4 may thus normalize and output feature values for the third convolutional layer 210c.

Accordingly, the outputs from the first convolutional layer 210a, the second convolutional layer 210b, and the third convolutional layer 210c may be combined (e.g., summed, whether weighted or not) to generate a feature map (e.g., three-dimensional matrices or vectors) for each frame. The feature maps may be processed as described in connection with FIG. 4.

As indicated above, FIG. 3 is provided as an example. Other examples may differ from what is described with regard to FIG. 3.

Figure 4:
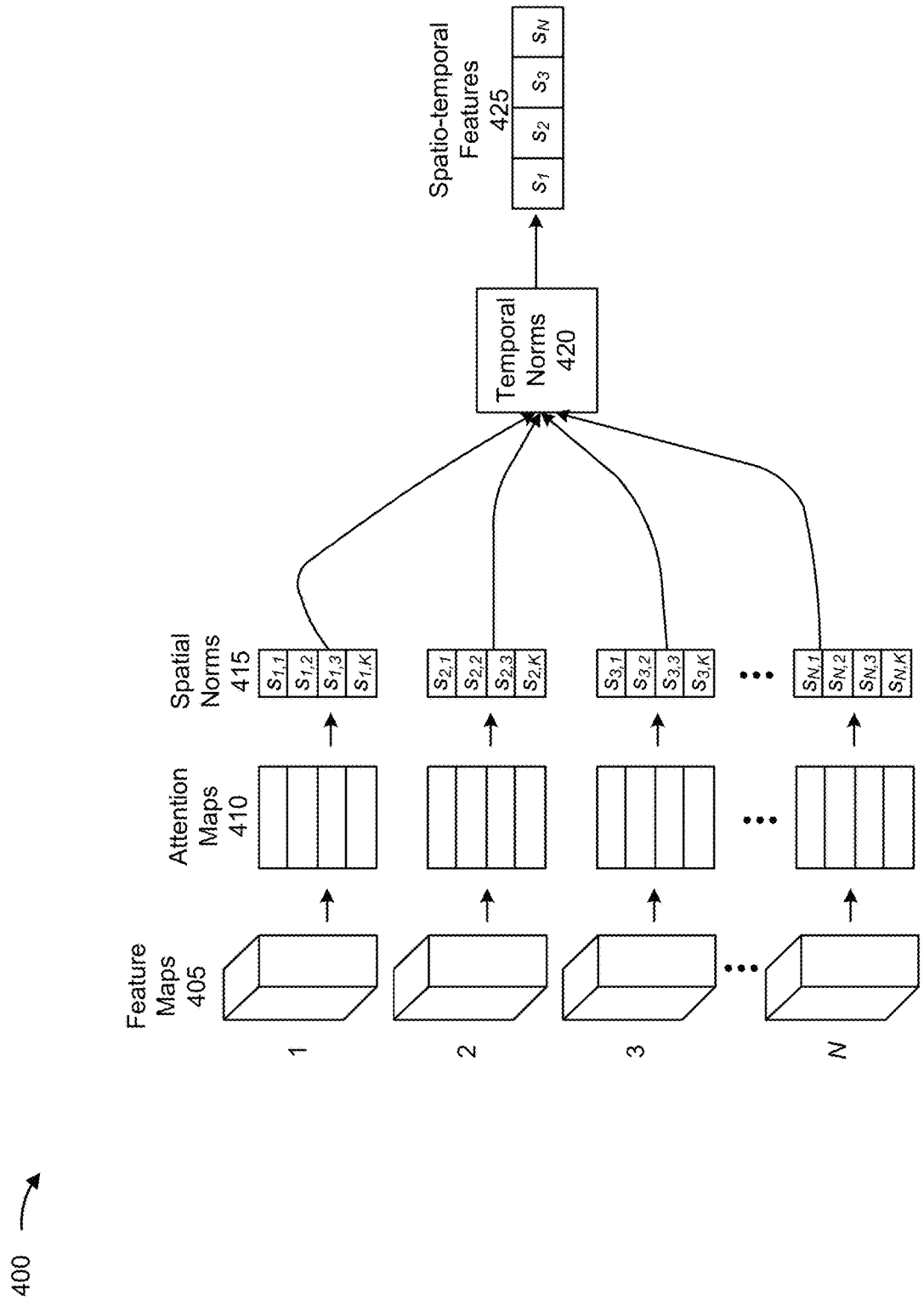
FIG. 4 is a diagram of an example implementation associated with determining spatio-temporal features from feature maps.

FIG. 4 is a diagram of an example implementation 400 associated with determining spatio-temporal features from feature maps. Example implementation 400 may be performed by a robot host, as described in more detail below in connection with FIG. 10 and FIG. 11.

As shown in FIG. 4, each frame in a sequence of frames (e.g., from a video 205), with a total quantity of frames represented by N, may be associated with a corresponding feature map of a set of feature maps 405. The feature maps are three-dimensional matrices or vectors calculated based on spatial and temporal features of each frame (e.g., as output by convolutional layers described in connection with FIG. 3). The set of feature maps 405 may be downsampled to generate a set of attention maps 410. For example, a feature map may include feature values associated with temporal moments before and after the frame associated with the feature maps. Therefore, the feature map may be downselected such that the attention map, corresponding to the feature map, only includes feature values associated with the temporal moment corresponding to the frame associated with the attention map. In other examples, the feature values in the feature map associated with different temporal moments may be combined (e.g., using a sum, weighted or not) to generate the attention map.

In one example, an attention map may be calculated from a corresponding feature map according to the following example equation:

$$g_n(h, w) = \frac{\left\|\Sigma_{d=1}^{D} f_n(h, w, d)^2\right\|_2}{\Sigma_{h,w}^{H,W}\left\|\Sigma_{d=1}^{D} f_n(h, w, d)^2\right\|_2},$$

where $g_n$ represents the attention map values, $f_n$ represents the feature map values, H represents the height of the feature map, W represents the width of the feature map, and D represents the depth of the feature map. Accordingly, the attention map represents L2 normalization on a square sum through a depth channel of the feature map.

As further shown in FIG. 4, the set of attention maps 410 may be normalized to generate a set of spatial norms 415. For example, the attention maps may be divided into regions such that the values in each region are normalized into a single spatial norm corresponding to the region. In example implementation 400, the regions are rows of the attention maps 410, with a total quantity of rows represented by K. Other implementations may use different regions (e.g., columns, 2×2 squares, 3×1 rectangles, or 1×3 rectangles, among other examples). The set of spatial norms 415 may comprise L1 norms, L2 norms, max norms, or output from another type of normalization formula.

In one example, each attention map is divided into K blocks according to the following example equation:

$$g_n = [g_{n,1}, \ldots, g_{n,k}, \ldots, g_{n,K}]$$

where $g_{n,k}$ represents a portion of the set of attention maps 410 corresponding to the $k^{th}$ region of the $n^{th}$ frame. Furthermore, the set of spatial norms 415 may be calculated from the set of attention maps 410 according to the following example equation:

$$s_{n,k} = \sum_{i,j} \|g_{n,k}(i, j)\|_1,$$

where $s_{n,k}$ represents the spatial norm (also referred to as a "spatial attention score") corresponding to the $k^{th}$ region of the $n^{th}$ frame. Accordingly, the set of spatial norms 415 represent L1 normalization on the set of attention maps 410. The set of spatial norms 415 therefore form a matrix (e.g., represented by S) with length N*K, as shown in FIG. 4.

Additionally, temporal normalization 420 may be applied to generate the set of spatio-temporal features 425 from the set of spatial norms 415. For example, for each frame, a largest spatial norm in a subset, of the set of spatial norms 415, that corresponds to the frame may be selected and normalized with similarly selected spatial norms for neighboring frames. In another example, for each frame, a weighted sum of spatial norms in a subset, of the set of spatial norms 415, that corresponds to the frame may be normalized with similarly calculated weighted sums for neighboring frames. Accordingly, the set of spatio-temporal features 425 may be used for labeling of the frames, as described in connection with FIG. 2.

In one example, a set of soft attention weights may be calculated according to the following example equation:

$$e_{n,k} = (w_{t,k})^T \cdot s_{t,k} + b_{t,k},$$

where $e_{n,k}$ represents the soft attention weight corresponding to the $k^{th}$ region of the $n^{th}$ frame, $w_{t,k}$ is a real number and represents a learned attention parameter, and $b_{t,k}$ is a real number and represents a learned attention parameter. Accordingly, the set of soft attention weights may be normalized according to the following example equation:

$$\alpha_{n,k} = \frac{e_{n,k}}{\sum_{j=1}^{N} e_{j,k}},$$

where $\alpha_{n,k}$ represents the temporal attention (also referred to as an "importance weight") corresponding to the $k^{th}$ region of the $n^{th}$ frame. Therefore, the set of spatio-temporal features 425 may be calculated according to the following example equation:

$$s_k = \sum_{n=1}^{N} \alpha_{n,k} s_{n,k},$$

where $s_k$ represents the spatio-temporal feature corresponding to the $k^{th}$ region. Alternatively, as shown in FIG. 4, the set of spatio-temporal features 425 may be calculated using a weighted average over regions rather than frames. Therefore, the set of spatio-temporal features 425 may be represented as a vector concatenating each spatio-temporal feature:

$$s=[s_1, \ldots, s_K].$$

As indicated above, FIG. 4 is provided as an example. Other examples may differ from what is described with regard to FIG. 4.

FIG. 5 is a diagram of an example assembly plan 500. Example assembly plan 500 may be generated by a robot host, as described in more detail below in connection with FIG. 10 and FIG. 11.

As shown in FIG. 5, the example assembly plan 500 represents a sequence of actions. In FIG. 5, the sequence of actions includes a "flip" action and a "pickup" action into an "align" action, followed by a "spin" action and a "pickup" action into another "align" action. Further, the sequence of actions includes a "spin" action" and "pickup" action into yet another "align" action, followed by a "spin" action and a "pickup" action into a fourth "align" action. Finally, the sequence of actions includes a "spin" action and a "pickup" action into an "attach" action. Other implementations may include different and/or additional actions.

As further shown in FIG. 5, each action is represented by a node with at least one input sub-object and at least one output sub-object. For example, each "pickup," "flip," and "spin" action includes a same sub-object as input and output. On the other hand, each "align" and "attach" action includes at least two sub-objects as input and a combination of the at least two sub-objects as output. Other implementations may include actions with different types of inputs and outputs.

As indicated above, FIG. 5 is provided as an example. Other examples may differ from what is described with regard to FIG. 5. For example, the example assembly plan 500 in FIG. 5 is a graphical data structure, but other implementations may use a tabular data structure or another type of data structure.

Figure 6:
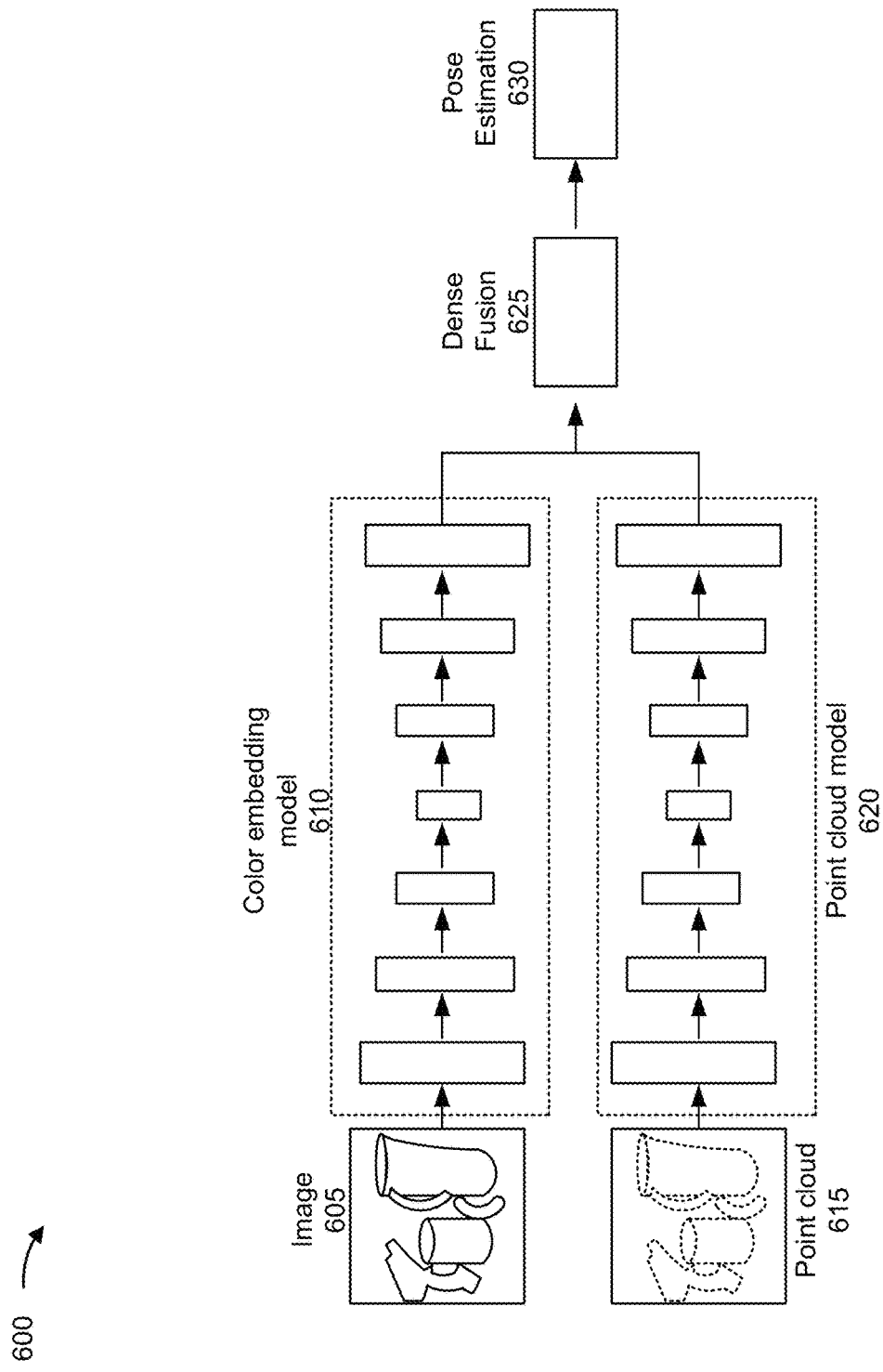
FIG. 6 is a diagram of an example implementation associated with combining output from a point cloud model and output from a color embedding model to estimate six-dimensional pose.

FIG. 6 is a diagram of an example implementation 600 associated with combining output from a point cloud model and output from a color embedding model to estimate six-dimensional pose. Example implementation 600 may be performed by a robot host, as described in more detail below in connection with FIG. 10 and FIG. 11.

As shown in FIG. 6, an image 605 may be a frame from a sequence of frames (e.g., from a video 205). The image 605 may be input to a color embedding model 610, which may be a CNN, as described in connection with FIG. 8A. Additionally, a point cloud 615 may be estimated based on the image 605 (e.g., by estimating depths within the image 605 based on the video 205). The point cloud 615 may be input to a point cloud model 620, which may be a CNN, as described in connection with FIG. 8B.

Accordingly, for a sub-object represented in the image 605 and the point cloud 615, a pixel-wise dense fusion matrix may be calculated using dense fusion 625. The dense fusion 625 may combine output from the point cloud model 620 and output from the color embedding model 610, as described in connection with FIG. 7. In some implementations, the dense fusion 625 may further include generation of global features based on pooling the output from the point cloud model 620 and the output from the color embedding model 610.

In one example, pixel-to-point fusion may be performed according to the following equation:

$$F_{pi2p}=\text{MLP}(F_{pi}; \forall K \in K_{pi}),$$

where $F_{pi2p}$ represents a combined pixel value, $F_{pi}$ represents a pixel value (output by the color embedding model 610) corresponding to a point value (output by the point cloud model 620), MLP represents a multilayer perceptron function, and $\forall K$ represents a set of neighboring points such that the multilayer perceptron function is applied to the pixel value corresponding to the point value as well as neighboring pixel values. Accordingly, a pixel-to-point value representing fusion of the output from the color embedding model 610 with the output from the point cloud model 620 may be calculated according to the following equation:

$$F_{fp}=\text{MLP}(F_p \oplus F_{pi2p}),$$

where $F_{fp}$ represents the pixel-to-point value, and $F_p$ represents the point value (output by the point cloud model 620) corresponding to the combined pixel value $F_{pi2p}$.

Similarly, point-to-pixel fusion may be performed according to the following equation:

$$F_{p2pi}=\text{MLP}(F_p; \forall K \in K_p),$$

where $F_{p2pi}$ represents a combined point value, $F_p$ represents a point value (output by the point cloud model 620) corresponding to a pixel value (output by the color embedding model 610), MLP represents a multilayer perceptron function, and $\forall K$ represents a set of neighboring points such that the multilayer perceptron function is applied to the point value corresponding to the pixel value as well as neighboring point values. Accordingly, a point-to-pixel value representing fusion of the output from the point cloud model 620 with the output from the color embedding model 610 may be calculated according to the following equation:

$$F_{fpi}=\text{MLP}(F_{pi} \oplus F_{p2pi}),$$

where $F_{fpi}$ represents the point-to-pixel value, and $F_{pi}$ represents the pixel value (output by the color embedding model 610) corresponding to the combined point value $F_{p2pi}$. Therefore, the dense fusion 625 may include both pixel-to-point values and point-to-pixel values, calculated as described above.

Accordingly, output from the dense fusion 625 may be used for pose estimation 630. Pose estimation 630 may include a softmax layer and/or another type of model that transforms feature values (e.g., vectors output from the dense fusion 625) into six-dimensional coordinate estimates. Accordingly, the color embedding model 610, the point cloud model 620, the dense fusion 625, and the pose estimation 630 may be performed for each sub-object in each frame of the video 205. As a result, for each sub-object, sets of six-dimensional coordinates may be calculated, where each set of six-dimensional coordinates is associated with a corresponding frame out of the sequence of frames. The sets of six-dimensional coordinates, for a sub-object shown in a group of the sequence of frames, may thus be associated with an action represented in an assembly plan and corresponding to the group of frames.

As indicated above, FIG. 6 is provided as an example. Other examples may differ from what is described with regard to FIG. 6.

Figure 7:
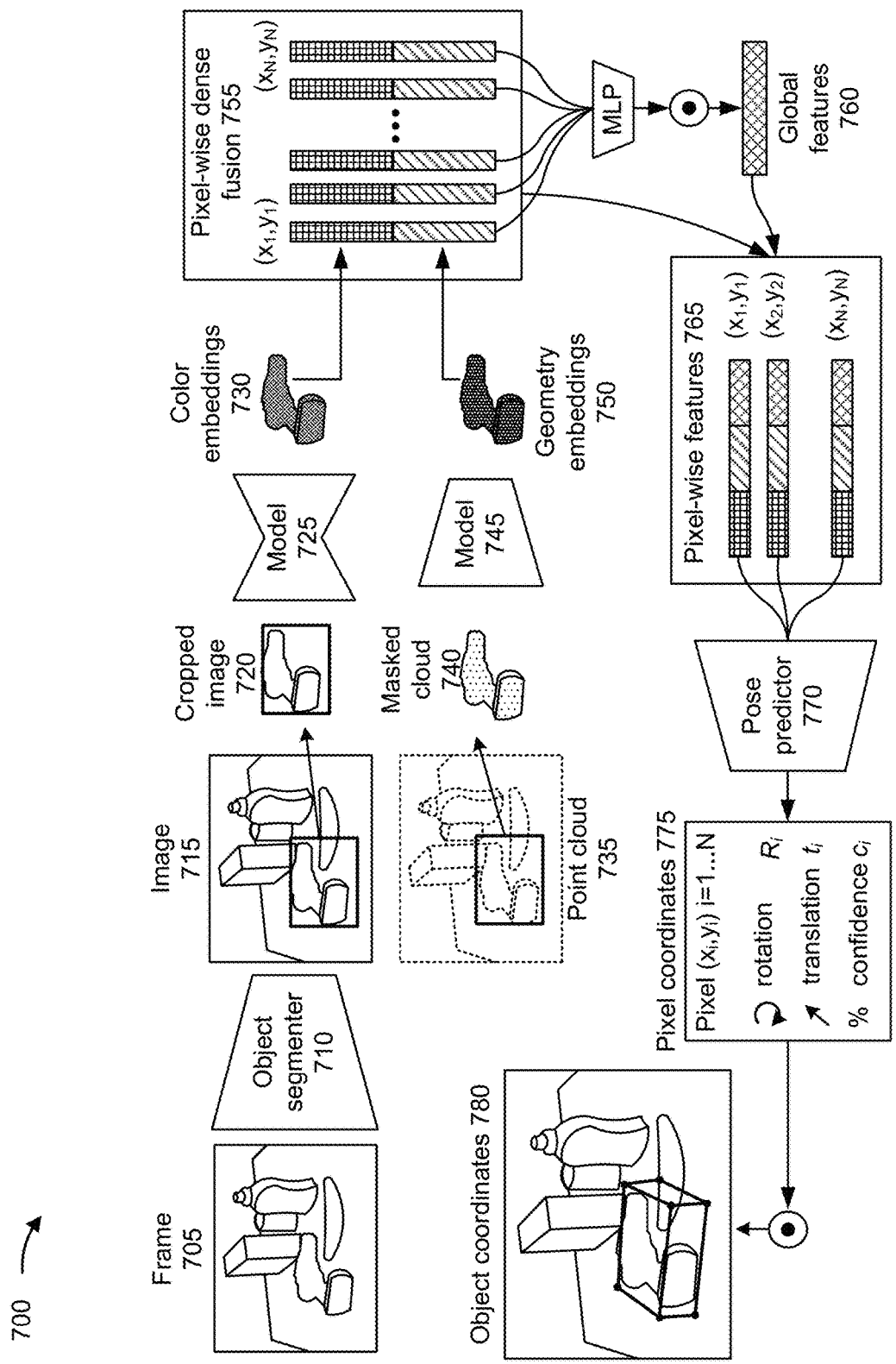
FIG. 7 is a diagram of an example implementation associated with combining output from a point cloud model and output from a color embedding model.

FIG. 7 is a diagram of an example implementation 700 associated with combining output from a point cloud model and output from a color embedding model. Example implementation 700 may be performed by a robot host, as described in more detail below in connection with FIG. 10 and FIG. 11.

As shown in FIG. 7, a frame 705 may be from a sequence of frames (e.g., from a video 205). The frame 705 may be input to an object segmenter 710 to identify one or more sub-objects in the frame 705. As described in connection with FIG. 1C, the object segmenter 710 may include an FCN for object segmentation or an R-CNN, among other examples. The object segmenter 710 may calculate an object mask associated with a sub-object such that the image 715 (corresponding to the frame 705) may be cropped, according to the object mask, to generate a cropped image 720. The cropped image 720 may be fed to a model 725 (e.g., a CNN as described in connection with FIG. 8A) to generate a vector of feature values representing color embeddings 730 for the sub-object.

Similarly, a point cloud 735 corresponding to the frame 705 may be determined (e.g., by estimating depths within the frame 705 based on the video 205). Similar to the image 715, the point cloud 735 (corresponding to the frame 705) may be cropped, according to the object mask, to generate a masked cloud 740. The masked cloud 740 may be fed to a model 745 (e.g., a CNN as described in connection with FIG. 8B) to generate a vector of feature values representing geometry embeddings 750 for the sub-object.

As shown in FIG. 7, pixel-wise dense fusion 755 may be applied to the color embeddings 730 and the geometry embeddings 750 for the sub-object. For example, a feature value associated with a point in the color embeddings 730 may be combined (e.g., in a sum, whether weighted or not) with one or more feature values associated with a corresponding point (and optionally with one or more neighboring points) in the geometry embeddings 750. Similarly, a feature value associated with a point in the geometry embeddings 750 may be combined (e.g., in a sum, whether weighted or not) with one or more feature values associated with a corresponding point (and optionally with one or more neighboring points) in the color embeddings 730. The combined feature values may be arranged in a matrix or another similar type of mathematical structure.

In some implementations, as shown in FIG. 7, pooling (e.g., multilayer perceptron (MLP) or max pooling) may be applied to the feature values from the pixel-wise dense fusion 755 to generate a set of global feature values 760. Accordingly, a set of pixel-wise features 765 may be assembled that includes, for each pixel, a corresponding color embedding value combined with geometry embedding values, a corresponding geometry embedding value combined with color embedding values, and the set of global feature values 760. Accordingly, the pose predictor 770 may estimate a set of pixel coordinates 775 (e.g., three-dimensional coordinates) along with a rotation value (e.g., represented by R1) and a translation value (e.g., represented by t) that may be used to estimate a set of angular coordinates to combine with the set of pixel coordinates 775 to generate a set of object coordinates 780 (e.g., six-dimensional coordinates). In some implementations, the pose predictor 770 may output a confidence value (e.g., represented by c1) such that only sets of object coordinates 780 associated with confidence values that satisfy a confidence threshold are mapped to an assembly plan (e.g., as described in connection with FIGS. 1C and 6).

As indicated above, FIG. 7 is provided as an example. Other examples may differ from what is described with regard to FIG. 7.

Figure 8A:
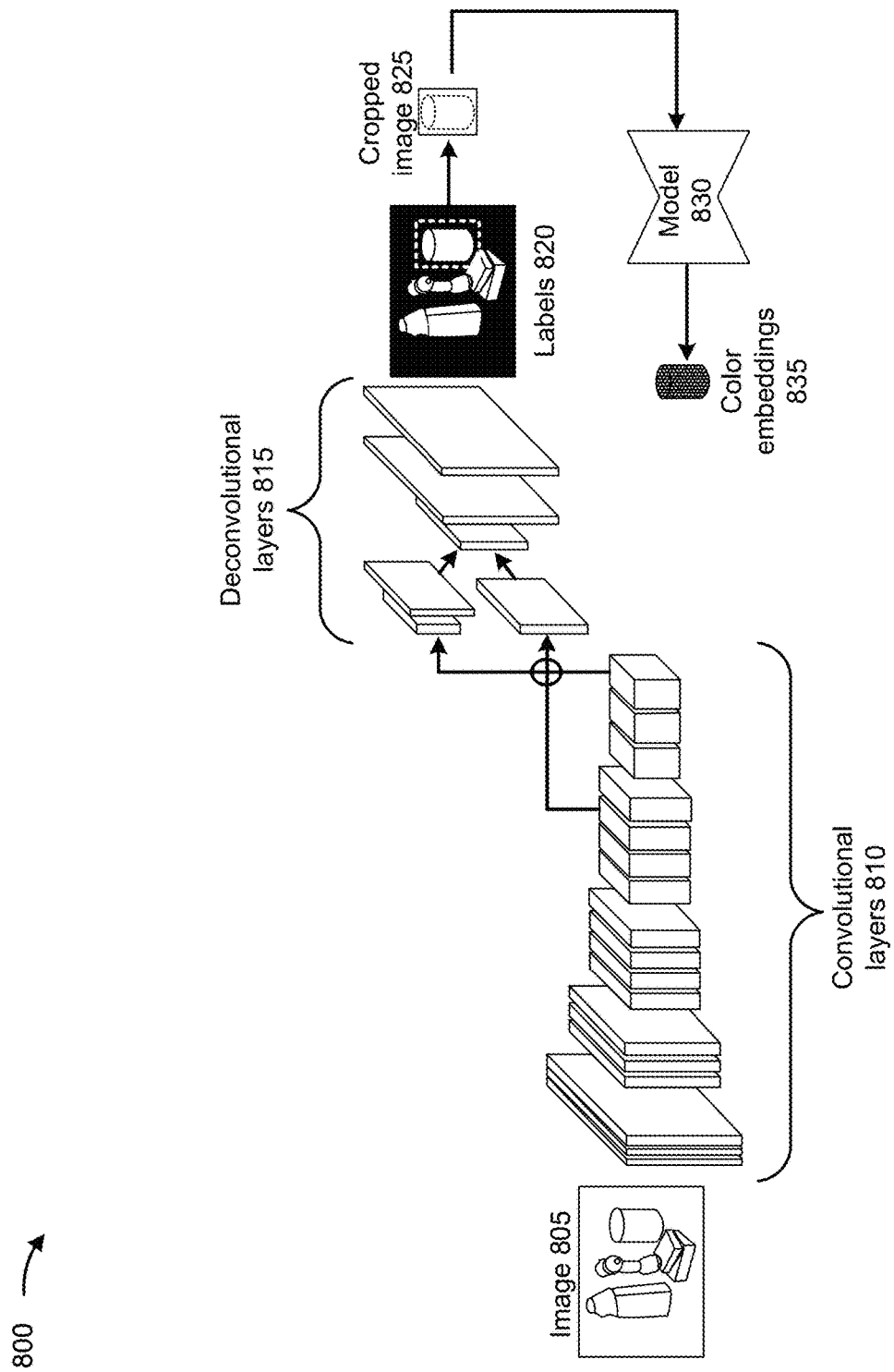
FIG. 8A is a diagram of an example implementation associated with a color embedding model.

FIG. 8A is a diagram of an example implementation 800 associated with a color embedding model. Example implementation 800 may be performed by a robot host, as described in more detail below in connection with FIG. 10 and FIG. 11.

As shown in FIG. 8A, an object segmenter may accept, as input, an image 805. The image 805 may be a frame from a sequence of frames (e.g., from a video 205). The color embedding model may include a set of convolutional layers 810 coupled with a set of deconvolutional layers 815. The set of convolutional layers 810 may calculate feature values associated with the image 805, and the set of deconvolutional layers 815 may transform the calculated feature values into sub-object labels 820 and corresponding object masks.

Accordingly, as described in connection with FIG. 7, the image 805 may be cropped, according to an object mask associated with a sub-object, to generate a cropped image 825. The cropped image 825 may be input to a color embedding model 830 (e.g., a CNN) that calculates feature values representing color embeddings 835.

Figure 8B:
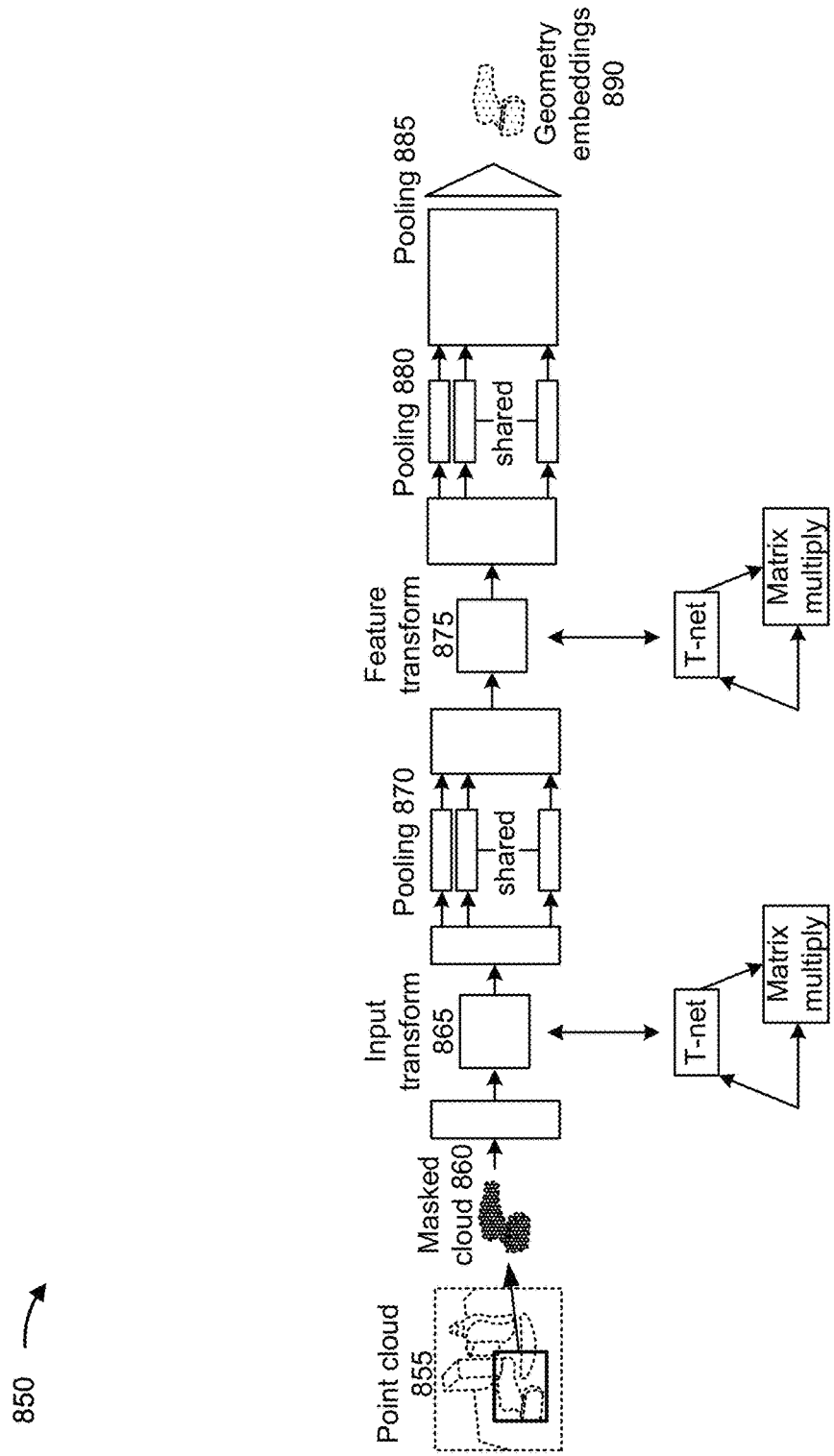
FIG. 8B is a diagram of an example implementation associated with a point cloud model.

FIG. 8B is a diagram of an example implementation 850 associated with a point cloud model. Example implementation 850 may be performed by a robot host, as described in more detail below in connection with FIG. 10 and FIG. 11.

As shown in FIG. 8B, a point cloud 855 may be calculated based on a frame (e.g., corresponding to image 805) from a sequence of frames (e.g., from a video 205). The point cloud 855 may be cropped, according to an object mask associated with a sub-object (e.g., determined using an object segmenter, as described in connection with FIG. 8A), to generate a masked cloud 860. The point cloud model may include an input transform 865 (e.g., formed of a series of tensor functions, such as T-net, and matrix multiply operations) coupled to a pooling layer 870. Furthermore, the point cloud model may include a feature transform 875 (e.g., formed of a series of tensor functions, such as T-net, and matrix multiply operations) coupled to a pooling layer 880. A final pooling layer 885 may transform values output from the feature transform 875 into feature values representing geometry embeddings 890.

As indicated above, FIGS. 8A and 8B are provided as examples. Other examples may differ from what is described with regard to FIGS. 8A and 8B.

Figure 9A:
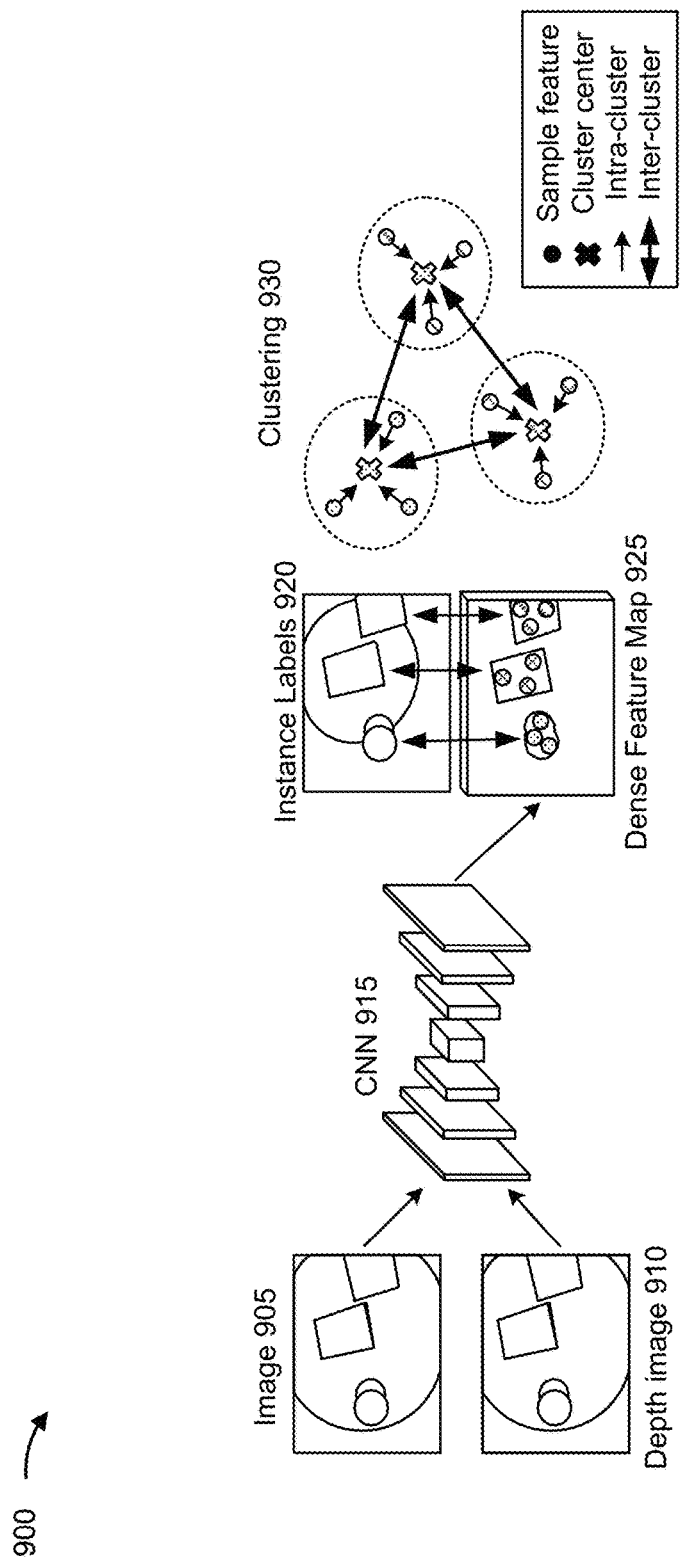
FIG. 9A is a diagram of an example implementation associated with object segmentation.
Figure 9B:
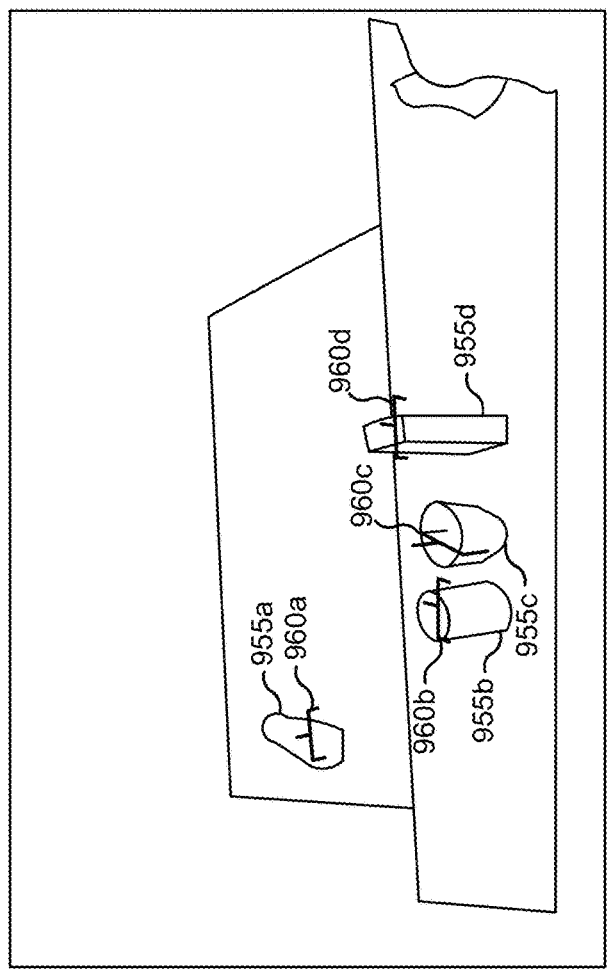
FIG. 9B is a diagram of an example output set associated with object segmentation.

FIG. 9A is a diagram of an example implementation 900 associated with object segmentation. Example implementation 900 may be performed by a robot host, as described in more detail below in connection with FIG. 10 and FIG. 11.

As shown in FIG. 9A, an image 905 (which may be a frame from a sequence of frames, such as a video 205) and a depth image 910 (e.g., determined by estimating depths within the image 905 based on the video 205) may be input into a CNN 915. The CNN 915 may calculate feature values from the image 905 and the depth image 910 to generate a dense feature map 925. Additionally, the CNN 915 may include one or more layers (e.g., softmax layers) that generate instance labels 920 for points in the image 905 (and the depth image 910). Accordingly, clustering 930 may be used to identify clusters of feature values (from the dense feature map 925) associated with different sub-objects represented in the image 905 (and indicated in the instance labels 920).

The clustering 930 may use a metric learning loss function or another type of loss function that clusters feature values, of the dense feature map 925, by similarity.

Based on the clustering 930, grip points may be determined for each sub-object (e.g., as shown in example output set 950 of FIG. 9B). For example, points that are associated with feature values closest to a center (or to an edge) of a cluster associated with a sub-object may be selected as grip points for the sub-object. Furthermore, widths between grip points on opposite surfaces of the sub-object may be calculated based on the image 905 and the depth image 910.

FIG. 9B is a diagram of an example output set 950 associated with object segmentation. Example output set 950 may be generated by a robot host, as described in more detail below in connection with FIG. 10 and FIG. 11.

As shown in FIG. 9B, a plurality of sub-objects are identified (e.g., by an object segmenter) in an image (e.g., a frame from a video 205). In example output set 950, the sub-objects include a tape dispenser 955a, a can 955b, a cup 955c, and a box 955d. Other implementations may include additional and/or different sub-objects. Based on object segmentation (e.g., as described in connection with FIG. 9A), each sub-object is associated with two grip points and a width therebetween. For example, the tape dispenser 955a is associated with a width 960a between two grip points, the can 955b is associated with a width 960b between two grip points, the cup 955c is associated with a width 960c between two grip points, and the box 955d is associated with a width 960d between two grip points. Although described with two grip points and a single width value, other implementations may calculate additional grip points (e.g., three grip points, four grip points, and so on) and thus additional width values (e.g., two width values, three width values, and so on).

As indicated above, FIGS. 9A and 9B are provided as examples. Other examples may differ from what is described with regard to FIGS. 9A and 9B.

Figure 10:
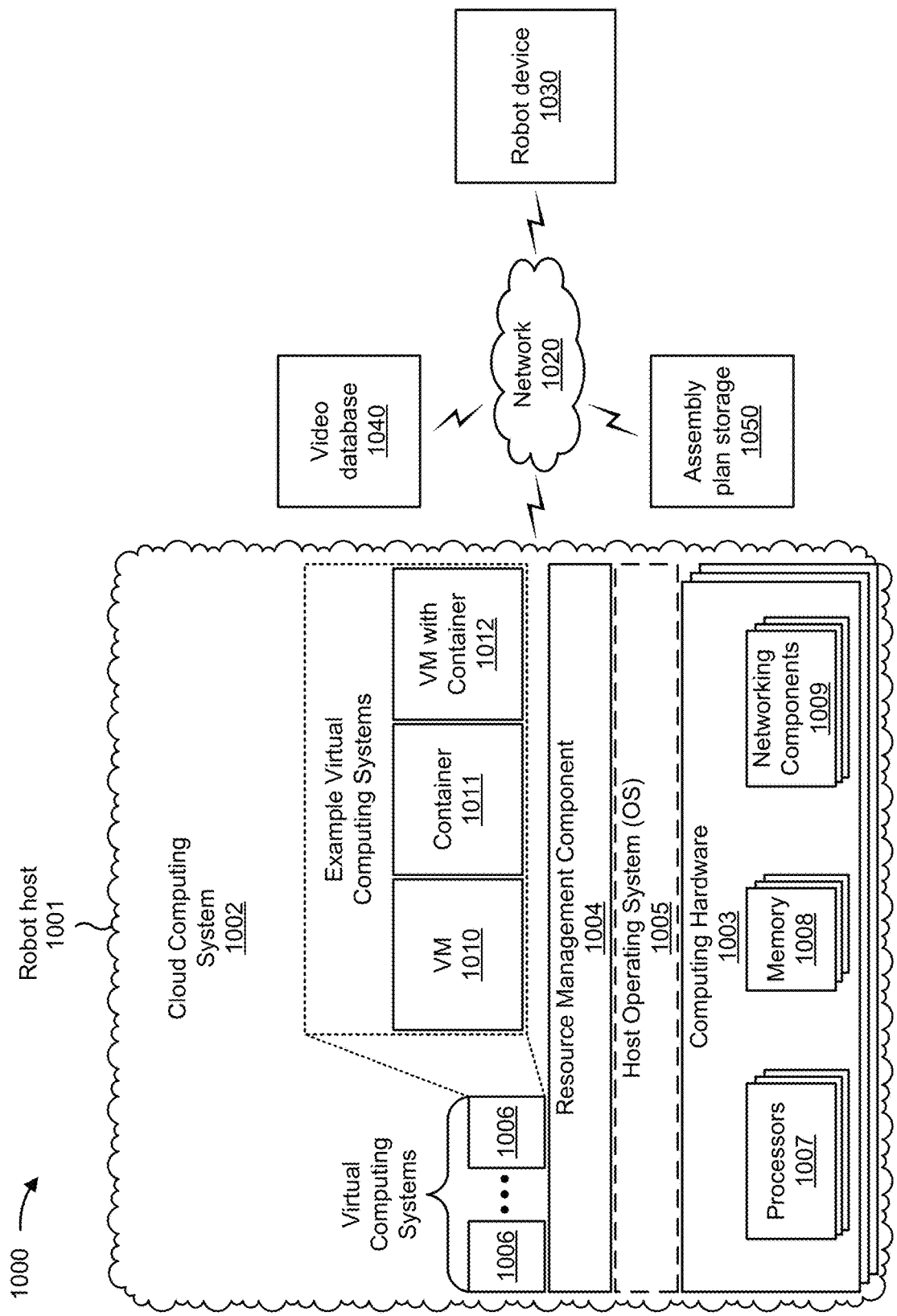
FIG. 10 is a diagram of an example environment in which systems and/or methods described herein may be implemented.

FIG. 10 is a diagram of an example environment 1000 in which systems and/or methods described herein may be implemented. As shown in FIG. 10, environment 1000 may include a robot host 1001, which may include one or more elements of and/or may execute within a cloud computing system 1002. The cloud computing system 1002 may include one or more elements 1003-1012, as described in more detail below. As further shown in FIG. 10, environment 1000 may include a network 1020, a robot device 1030, a device implementing a video database 1040, and/or a device implementing an assembly plan storage 1050. Devices and/or elements of environment 1000 may interconnect via wired connections and/or wireless connections.

The cloud computing system 1002 includes computing hardware 1003, a resource management component 1004, a host operating system (OS) 1005, and/or one or more virtual computing systems 1006. The cloud computing system 1002 may execute on, for example, an Amazon Web Services platform, a Microsoft Azure platform, or a Snowflake platform. The resource management component 1004 may perform virtualization (e.g., abstraction) of computing hardware 1003 to create the one or more virtual computing systems 1006. Using virtualization, the resource management component 1004 enables a single computing device (e.g., a computer or a server) to operate like multiple computing devices, such as by creating multiple isolated virtual computing systems 1006 from computing hardware 1003 of the single computing device. In this way, computing hardware 1003 can operate more efficiently, with lower power consumption, higher reliability, higher availability, higher utilization, greater flexibility, and lower cost than using separate computing devices.

Computing hardware 1003 includes hardware and corresponding resources from one or more computing devices. For example, computing hardware 1003 may include hardware from a single computing device (e.g., a single server) or from multiple computing devices (e.g., multiple servers), such as multiple computing devices in one or more data centers. As shown, computing hardware 1003 may include one or more processors 1007, one or more memories 1008, and/or one or more networking components 1009. Examples of a processor, a memory, and a networking component (e.g., a communication component) are described elsewhere herein.

The resource management component 1004 includes a virtualization application (e.g., executing on hardware, such as computing hardware 1003) capable of virtualizing computing hardware 1003 to start, stop, and/or manage one or more virtual computing systems 1006. For example, the resource management component 1004 may include a hypervisor (e.g., a bare-metal or Type 1 hypervisor, a hosted or Type 2 hypervisor, or another type of hypervisor) or a virtual machine monitor, such as when the virtual computing systems 1006 are virtual machines 1010. Additionally, or alternatively, the resource management component 1004 may include a container manager, such as when the virtual computing systems 1006 are containers 1011. In some implementations, the resource management component 1004 executes within and/or in coordination with a host operating system 1005.

A virtual computing system 1006 includes a virtual environment that enables cloud-based execution of operations and/or processes described herein using computing hardware 1003. As shown, a virtual computing system 1006 may include a virtual machine 1010, a container 1011, or a hybrid environment 1012 that includes a virtual machine and a container, among other examples. A virtual computing system 1006 may execute one or more applications using a file system that includes binary files, software libraries, and/or other resources required to execute applications on a guest operating system (e.g., within the virtual computing system 1006) or the host operating system 1005.

Although the robot host 1001 may include one or more elements 1003-1012 of the cloud computing system 1002, may execute within the cloud computing system 1002, and/or may be hosted within the cloud computing system 1002, in some implementations, the robot host 1001 may not be cloud-based (e.g., may be implemented outside of a cloud computing system) or may be partially cloud-based. For example, the robot host 1001 may include one or more devices that are not part of the cloud computing system 1002, such as device 1100 of FIG. 11, which may include a standalone server or another type of computing device. The robot host 1001 may perform one or more operations and/or processes described in more detail elsewhere herein.

Network 1020 includes one or more wired and/or wireless networks. For example, network 1020 may include a cellular network, a public land mobile network (PLMN), a local area network (LAN), a wide area network (WAN), a private network, the Internet, and/or a combination of these or other types of networks. The network 1020 enables communication among the devices of environment 1000.

The robot device 1030 may include one or more devices capable of moving, fastening, warping, turning, welding, gluing, and/or otherwise manipulating sub-objects. The robot device 1030 may include a communication device and/or a computing device (e.g., that processes instructions from the robot host 1001). The robot device 1030 may include, for example, a robotic arm, a robotic screwdriver, a robotic hammer, a robotic glue gun, a robotic welder, or a similar type of robotic device configured for at least one manipulation task.

The video database 1040 may be implemented on one or more devices capable of receiving, generating, storing, processing, and/or providing information associated with videos, as described elsewhere herein. The video database 1040 may be implemented on a communication device and/or a computing device. For example, the video database 1040 may be implemented on a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The assembly plan storage 1050 may be implemented on one or more devices capable of receiving, generating, storing, processing, and/or providing information associated with assembly plans, as described elsewhere herein. The assembly plan storage 1050 may be implemented on a communication device and/or a computing device. For example, the assembly plan storage 1050 may be implemented on a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

Figure 11:
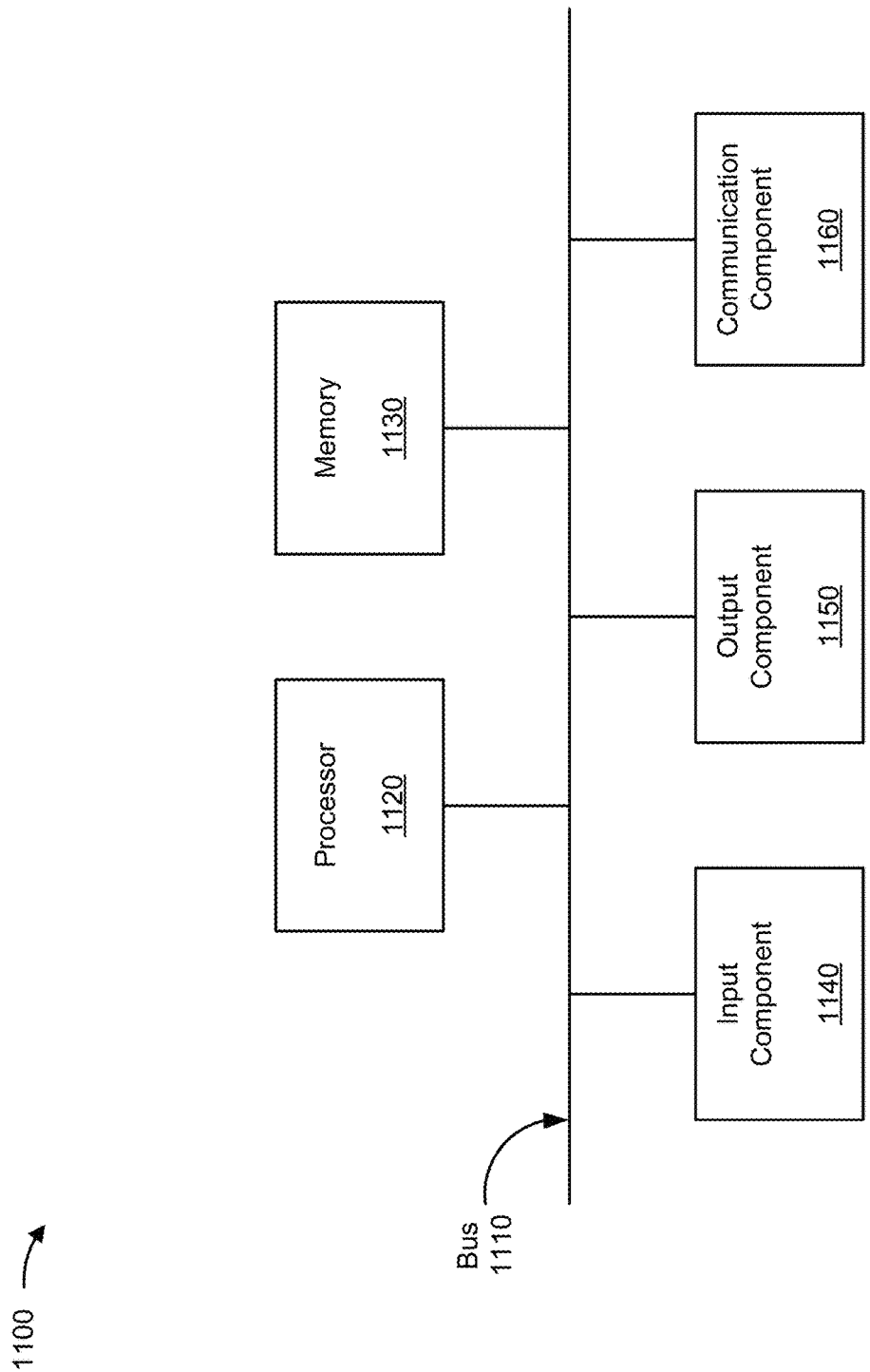
FIG. 11 is a diagram of example components of one or more devices of FIG. 10.

FIG. 11 is a diagram of example components of a device 1100 associated with generating robotic assembly instructions from a video. Device 1100 may correspond to a robot device, a device implementing a video database, and/or a device implementing an assembly plan storage. In some implementations, the robot device, the device implementing the video database, and/or the device implementing the assembly plan storage may include one or more devices 1100 and/or one or more components of device 1100. As shown in FIG. 11, device 1100 may include a bus 1110, a processor 1120, a memory 1130, an input component 1140, an output component 1150, and a communication component 1160.

Bus 1110 may include one or more components that enable wired and/or wireless communication among the components of device 1100. Bus 1110 may couple together two or more components of FIG. 11, such as via operative coupling, communicative coupling, electronic coupling, and/or electric coupling. Processor 1120 may include a central processing unit, a graphics processing unit, a microprocessor, a controller, a microcontroller, a digital signal processor, a field-programmable gate array, an application-specific integrated circuit, and/or another type of processing component. Processor 1120 is implemented in hardware, firmware, or a combination of hardware and software. In some implementations, processor 1120 may include one or more processors capable of being programmed to perform one or more operations or processes described elsewhere herein.

Memory 1130 may include volatile and/or nonvolatile memory. For example, memory 1130 may include random access memory (RAM), read only memory (ROM), a hard disk drive, and/or another type of memory (e.g., a flash memory, a magnetic memory, and/or an optical memory). Memory 1130 may include internal memory (e.g., RAM, ROM, or a hard disk drive) and/or removable memory (e.g., removable via a universal serial bus connection). Memory 1130 may be a non-transitory computer-readable medium. Memory 1130 stores information, instructions, and/or software (e.g., one or more software applications) related to the operation of device 1100. In some implementations, memory 1130 may include one or more memories that are coupled to one or more processors (e.g., processor 1120), such as via bus 1110.

Input component 1140 enables device 1100 to receive input, such as user input and/or sensed input. For example, input component 1140 may include a touch screen, a keyboard, a keypad, a mouse, a button, a microphone, a switch, a sensor, a global positioning system sensor, an accelerometer, a gyroscope, and/or an actuator. Output component 1150 enables device 1100 to provide output, such as via a display, a speaker, and/or a light-emitting diode. Communication component 1160 enables device 1100 to communicate with other devices via a wired connection and/or a wireless connection. For example, communication component 1160 may include a receiver, a transmitter, a transceiver, a modem, a network interface card, and/or an antenna.

Device 1100 may perform one or more operations or processes described herein. For example, a non-transitory computer-readable medium (e.g., memory 1130) may store a set of instructions (e.g., one or more instructions or code) for execution by processor 1120. Processor 1120 may execute the set of instructions to perform one or more operations or processes described herein. In some implementations, execution of the set of instructions, by one or more processors 1120, causes the one or more processors 1120 and/or the device 1100 to perform one or more operations or processes described herein. In some implementations, hardwired circuitry is used instead of or in combination with the instructions to perform one or more operations or processes described herein. Additionally, or alternatively, processor 1120 may be configured to perform one or more operations or processes described herein. Thus, implementations described herein are not limited to any specific combination of hardware circuitry and software.

The number and arrangement of components shown in FIG. 11 are provided as an example. Device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

Figure 12:
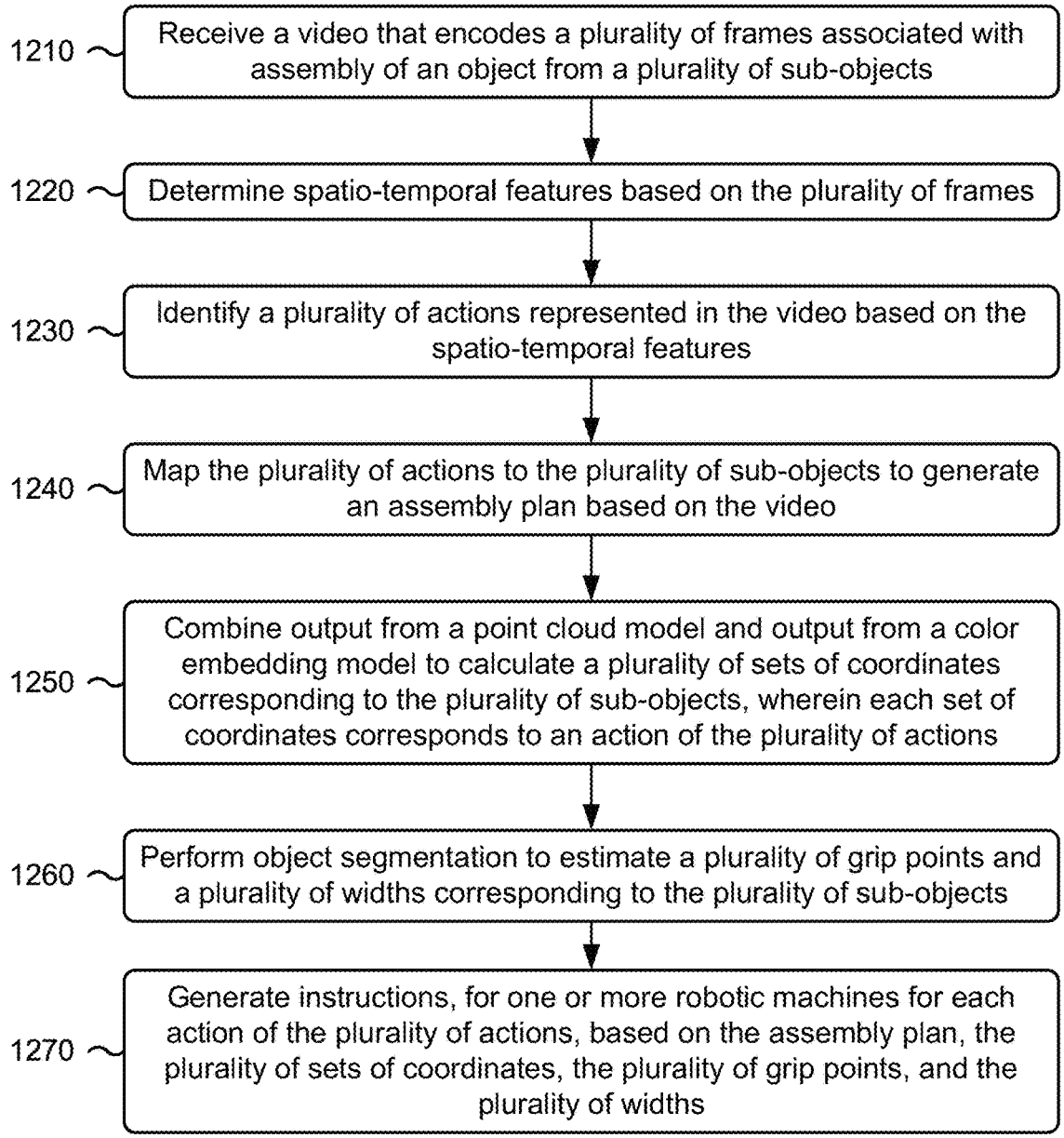
FIG. 12 is a flowchart of an example process relating to generating robotic assembly instructions from a video.

FIG. 12 is a flowchart of an example process 1200 associated with generating robotic assembly instructions from a video. In some implementations, one or more process blocks of FIG. 12 are performed by a robot host (e.g., robot host 1001). In some implementations, one or more process blocks of FIG. 12 are performed by another device or a group of devices separate from or including the robot host, such as a robot device (e.g., robot device 1030), a device implementing a video database (e.g., video database 1040), and/or a device implementing an assembly plan storage (e.g., assembly plan storage 1050). Additionally, or alternatively, one or more process blocks of FIG. 12 may be performed by one or more components of device 1100, such as processor 1120, memory 1130, input component 1140, output component 1150, and/or communication component 1160.

As shown in FIG. 12, process 1200 may include receiving a video that encodes a plurality of frames associated with assembly of an object from a plurality of sub-objects (block 1210). For example, the robot host may receive a video that encodes a plurality of frames associated with assembly of an object from a plurality of sub-objects, as described herein.

As further shown in FIG. 12, process 1200 may include determining spatio-temporal features based on the plurality of frames (block 1220). For example, the robot host may determine spatio-temporal features based on the plurality of frames, as described herein.

As further shown in FIG. 12, process 1200 may include identifying a plurality of actions represented in the video based on the spatio-temporal features (block 1230). For example, the robot host may identify a plurality of actions represented in the video based on the spatio-temporal features, as described herein.

As further shown in FIG. 12, process 1200 may include mapping the plurality of actions to the plurality of sub-objects to generate an assembly plan based on the video (block 1240). For example, the robot host may map the plurality of actions to the plurality of sub-objects to generate an assembly plan based on the video, as described herein.

As further shown in FIG. 12, process 1200 may include combining output from a point cloud model and output from a color embedding model to generate a plurality of sets of coordinates corresponding to the plurality of sub-objects (block 1250). For example, the robot host may combine output from a point cloud model and output from a color embedding model to generate a plurality of sets of coordinates corresponding to the plurality of sub-objects, as described herein. Each set of coordinates may correspond to a respective action of the plurality of actions.

As further shown in FIG. 12, process 1200 may include performing object segmentation to estimate a plurality of grip points and a plurality of widths corresponding to the plurality of sub-objects (block 1260). For example, the robot host may perform object segmentation to estimate a plurality of grip points and a plurality of widths corresponding to the plurality of sub-objects, as described herein.

As further shown in FIG. 12, process 1200 may include generating instructions, for one or more robotic machines for each action of the plurality of actions, based on the assembly plan, the plurality of sets of coordinates, the plurality of grip points, and the plurality of widths (block 1270). For example, the robot host may generate instructions, for one or more robotic machines for each action of the plurality of actions, based on the assembly plan, the plurality of sets of coordinates, the plurality of grip points, and the plurality of widths, as described herein.

Process 1200 may include additional implementations, such as any single implementation or any combination of implementations described below and/or in connection with one or more other processes described elsewhere herein.

In a first implementation, determining the spatio-temporal features includes applying a plurality of convolutional filters to the plurality of frames to generate feature values and combining the feature values to generate feature maps, such that the spatio-temporal features are based on the feature maps.

In a second implementation, alone or in combination with the first implementation, determining the spatio-temporal features includes generating attention maps, for the plurality of frames based on feature maps calculated for the plurality of frames, and normalizing the attention maps across a spatial dimension and across a temporal dimension to generate the spatio-temporal features.

In a third implementation, alone or in combination with one or more of the first and second implementations, identifying the plurality of actions includes applying a fully connected layer and a softmax layer to the spatio-temporal features, to generate a plurality of sets of probabilities corresponding to the plurality of frames, such that the plurality of actions are based on the plurality of sets of probabilities.

In a fourth implementation, alone or in combination with one or more of the first through third implementations, combining the output from the point cloud model and the output from the color embedding model includes generating a pixel-wise dense fusion matrix, using the output from the point cloud model and the output from the color embedding model, and generating global features based on pooling the output from the point cloud model and the output from the color embedding model, such that one of the plurality of sets of coordinates corresponding to one of the plurality of sub-objects is calculated based on the pixel-wise dense fusion matrix and the global features.

In a fifth implementation, alone or in combination with one or more of the first through fourth implementations, performing the object segmentation includes generating dense feature maps, based on one or more frames of the plurality of frames, and clustering pixels of the one or more frames based on the dense feature maps to form clustered pixels, such that the plurality of grip points and the plurality of widths are estimated based on the clustered pixels.

In a sixth implementation, alone or in combination with one or more of the first through fifth implementations, generating the instructions includes applying rapidly exploring random trees to the assembly plan, such that the plurality of actions are associated with a plurality of state transitions, and generating machine-level instructions, corresponding to the plurality of state transitions, based on the plurality of sets of coordinates, the plurality of grip points, and the plurality of widths.

Although FIG. 12 shows example blocks of process 1200, in some implementations, process 1200 includes additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving a video that encodes a plurality of frames associated with assembly of an object from a plurality of sub-objects;
   determining spatio-temporal features based on the plurality of frames;
   identifying a plurality of actions represented in the video based on the spatio-temporal features;
   mapping the plurality of actions to the plurality of sub-objects to generate an assembly plan based on the video;
   combining output from a point cloud model and output from a color embedding model to generate a plurality of sets of coordinates corresponding to the plurality of sub-objects, wherein each set of coordinates corresponds to a respective action of the plurality of actions;
   performing object segmentation to estimate a plurality of grip points and a plurality of widths corresponding to the plurality of sub-objects; and
   generating instructions, for one or more robotic machines for each action of the plurality of actions, based on the assembly plan, the plurality of sets of coordinates, the plurality of grip points, and the plurality of widths,
   wherein combining the output from the point cloud model and the output from the color embedding model comprises:
      generating a pixel-wise dense fusion matrix using the output from the point cloud model and the output from the color embedding model; and
      generating global features based on pooling the output from the point cloud model and the output from the color embedding model,
      wherein one of the plurality of sets of coordinates corresponding to one of the plurality of sub-objects is calculated based on the pixel-wise dense fusion matrix and the global features.

2. The method of claim 1, wherein determining the spatio-temporal features comprises:
   applying a plurality of convolutional filters to the plurality of frames to generate feature values; and
   combining the feature values to generate feature maps, wherein the spatio-temporal features are based on the feature maps.

3. The method of claim 1, wherein determining the spatio-temporal features comprises: generating attention maps for the plurality of frames based on feature maps calculated for the plurality of frames; and
   normalizing the attention maps across a spatial dimension and across a temporal dimension to generate the spatio-temporal features.

4. The method of claim 1, wherein identifying the plurality of actions comprises: applying a fully connected layer and a softmax layer to the spatio-temporal features to generate a plurality of sets of probabilities corresponding to the plurality of frames, wherein the plurality of actions are based on the plurality of sets of probabilities.

5. The method of claim 1, wherein performing the object segmentation comprises:
   generating dense feature maps based on one or more frames of the plurality of frames; and
   clustering pixels of the one or more frames based on the dense feature maps to form clustered pixels,
   wherein the plurality of grip points and the plurality of widths are estimated based on the clustered pixels.

6. The method of claim 1, wherein generating the instructions comprises:
   applying rapidly exploring random trees to the assembly plan, wherein the plurality of actions are associated with a plurality of state transitions; and
   generating machine-level instructions, corresponding to the plurality of state transitions, based on the plurality of sets of coordinates, the plurality of grip points, and the plurality of widths.

7. A device, comprising:
   one or more memories; and
   one or more processors, communicatively coupled to the one or more memories, configured to:
      receive a video that encodes a plurality of frames associated with assembly of an object from a plurality of sub-objects;
      determine spatio-temporal features based on the plurality of frames;
      identify a plurality of actions represented in the video based on the spatio-temporal features;
      map the plurality of actions to the plurality of sub-objects to generate an assembly plan based on the video;

combine output from a point cloud model and output from a color embedding model to generate a plurality of sets of coordinates corresponding to the plurality of sub-objects, wherein each set of coordinates corresponds to a respective action of the plurality of actions;

perform object segmentation to estimate a plurality of grip points and a plurality of widths corresponding to the plurality of sub-objects; and generate instructions, for one or more robotic machines for each action of the plurality of actions, based on the assembly plan, the plurality of sets of coordinates, the plurality of grip points, and the plurality of widths, wherein the one or more processors, to combine the output from the point cloud model and the output from the color embedding model, are configured to:

generate a pixel-wise dense fusion matrix using the output from the point cloud model and the output from the color embedding model; and generate global features based on pooling the output from the point cloud model and the output from the color embedding model, wherein one of the plurality of sets of coordinates corresponding to one of the plurality of sub-objects is calculated based on the pixel-wise dense fusion matrix and the global features.

8. The device of claim 7, wherein the one or more processors, to determine the spatio-temporal features, are configured to:

apply a plurality of convolutional filters to the plurality of frames to generate feature values; and combine the feature values to generate feature maps, wherein the spatio-temporal features are based on the feature maps.

9. The device of claim 7, wherein the one or more processors, to determine the spatio-temporal features, are configured to:

generate attention maps for the plurality of frames based on feature maps calculated for the plurality of frames; and normalize the attention maps across a spatial dimension and across a temporal dimension to generate the spatio-temporal features.

10. The device of claim 7, wherein the one or more processors, to identify the plurality of actions, are configured to:

apply a fully connected layer and a softmax layer to the spatio-temporal features to generate a plurality of sets of probabilities corresponding to the plurality of frames, wherein the plurality of actions are based on the plurality of sets of probabilities.

11. The device of claim 7, wherein the one or more processors, to perform the object segmentation, are configured to:

generate dense feature maps based at one or more frames of the plurality of frames; and cluster pixels of the one or more frames based on the dense feature maps to form clustered pixels, wherein the plurality of grip points and the plurality of widths are estimated based on the clustered pixels.

12. The device of claim 7, wherein the one or more processors, to generate the instructions, are configured to:

apply rapidly exploring random trees to the assembly plan, wherein the plurality of actions are associated with a plurality of state transitions; and generate machine-level instructions, corresponding to the plurality of state transitions, based on the plurality of sets of coordinates, the plurality of grip points, and the plurality of widths.

13. A non-transitory computer-readable medium storing a set of instructions, the set of instructions comprising:

one or more instructions that, when executed by one or more processors of a device, cause the device to:

receive a video that encodes a plurality of frames associated with assembly of an object from a plurality of sub-objects;

determine spatio-temporal features based on the plurality of frames; identify a plurality of actions represented in the video based on the spatio-temporal features;

map the plurality of actions to the plurality of sub-objects to generate an assembly plan based on the video;

combine output from a point cloud model and output from a color embedding model to calculate a plurality of sets of coordinates corresponding to the plurality of sub-objects, wherein each set of coordinates corresponds to a respective action of the plurality of actions;

perform object segmentation to estimate a plurality of grip points and a plurality of widths corresponding to the plurality of sub-objects; and generate instructions, for one or more robotic machines for each action of the plurality of actions, based on the assembly plan, the plurality of sets of coordinates, the plurality of grip points, and the plurality of widths, wherein the one or more instructions, that cause the device to combine the output from the point cloud model and the output from the color embedding model, cause the device to:

generate a pixel-wise dense fusion matrix using the output from the point cloud model and the output from the color embedding model; and generate global features based on pooling the output from the point cloud model and the output from the color embedding model, wherein one of the plurality of sets of coordinates corresponding to one of the plurality of sub-objects is calculated based on the pixel-wise dense fusion matrix and the global features.

14. The non-transitory computer-readable medium of claim 13, wherein the one or more instructions, that cause the device to determine the spatio-temporal features, cause the device to:

generate attention maps for the plurality of frames based on feature maps calculated for the plurality of frames; and normalize the attention maps across a spatial dimension and across a temporal dimension to generate the spatio-temporal features.

15. The non-transitory computer-readable medium of claim 13, wherein the one or more instructions, that cause the device to identify the plurality of actions, cause the device to:

apply a fully connected layer and a softmax layer to the spatio-temporal features to generate a plurality of sets of probabilities corresponding to the plurality of frames, wherein the plurality of actions are based on the plurality of sets of probabilities.

16. The non-transitory computer-readable medium of claim 13, wherein the one or more instructions, that cause the device to perform the object segmentation, cause the device to:
- generate dense feature maps based at one or more frames of the plurality of frames; and
- cluster pixels of the one or more frames based on the dense feature maps to form clustered pixels,
- wherein the plurality of grip points and the plurality of widths are estimated based on the clustered pixels.

17. The non-transitory computer-readable medium of claim 13, wherein the one or more instructions, that cause the device to generate the instructions, cause the device to:
- apply rapidly exploring random trees to the assembly plan, wherein the plurality of actions are associated with a plurality of state transitions; and
- generate machine-level instructions, corresponding to the plurality of state transitions, based on the plurality of sets of coordinates, the plurality of grip points, and the plurality of widths.

\* \* \* \* \*